United States Patent
Nishioka et al.

(10) Patent No.: US 7,209,326 B2
(45) Date of Patent: Apr. 24, 2007

(54) MAGNETORESISTIVE HEAD AND MANUFACTURING METHOD THEREOF

(75) Inventors: Koichi Nishioka, Hiratsuka (JP); Satoshi Shigematsu, Yokohama (JP)

(73) Assignee: Hitachi Global Storage Technologies Japan, Ltd., Odawara (JP)

(*) Notice: Subject to any disclaimer, the term of this patent is extended or adjusted under 35 U.S.C. 154(b) by 446 days.

(21) Appl. No.: 10/804,564

(22) Filed: Mar. 18, 2004

(65) Prior Publication Data

US 2004/0246632 A1 Dec. 9, 2004

(30) Foreign Application Priority Data

Mar. 27, 2003 (JP) ............... 2003-086910

(51) Int. Cl.
*G11B 5/39* (2006.01)
(52) U.S. Cl. ............................ 360/324.11
(58) Field of Classification Search ............ 360/324.1, 360/324.2, 324.11, 324.12
See application file for complete search history.

(56) References Cited

U.S. PATENT DOCUMENTS

| | | | |
|---|---|---|---|
| 5,159,513 A | | 10/1992 | Dieny et al. |
| 5,465,185 A | * | 11/1995 | Heim et al. ............ 360/324.11 |
| 5,583,725 A | | 12/1996 | Coffey et al. |
| 5,701,223 A | * | 12/1997 | Fontana et al. ........ 360/324.11 |
| 6,118,622 A | * | 9/2000 | Gill ............................ 360/66 |
| 6,221,172 B1 | * | 4/2001 | Saito et al. ................ 148/108 |
| 6,313,973 B1 | | 11/2001 | Fuke et al. |
| 6,538,917 B1 | * | 3/2003 | Tran et al. .................. 365/158 |
| 6,576,969 B2 | * | 6/2003 | Tran et al. .................. 257/421 |
| 6,891,746 B2 | * | 5/2005 | Tran et al. .................. 365/158 |
| 2003/0179516 A1 | * | 9/2003 | Freitag et al. ......... 360/324.11 |
| 2004/0145835 A1 | * | 7/2004 | Gill ........................... 360/314 |

FOREIGN PATENT DOCUMENTS

| | | | |
|---|---|---|---|
| JP | 10223942 A | * | 8/1998 |
| JP | 2000-113418 A | | 4/2000 |
| JP | 2000113418 A | * | 4/2000 |

* cited by examiner

*Primary Examiner*—William J Klimowicz
(74) *Attorney, Agent, or Firm*—Townsend and Townsend and Crew LLP

(57) ABSTRACT

A magnetoresistive head in which a pinned layer comprises two films, i.e., a ferromagnetic film A and a ferromagnetic B anti-ferromagnetically coupled to each other and a anti-ferromagnetic coupling film for separating the two ferromagnetic films A and B, where the coercivity of the ferromagnetic film alone is 200 (Oe) or more and the coercivity of the ferromagnetic film alone is 20 (Oe) or less. The compositions for the ferromagnetic film A and the ferromagnetic film B, when expressed by $Co_{100-Y}Fe_Y$ (at %) are: ferromagnetic film A: $80 \geq Y \geq 40$, and ferromagnetic film B: $20 \geq Y \geq 0$, where the material for the film in contact with the ferromagnetic film A is Ru, Ta, NiFeCr, Cu or NiFe.

28 Claims, 19 Drawing Sheets

FIG.6(a)

| Ru (A) \ Ferromagnetic film A (A) | 22.0 | 22.5 | 23.0 | 23.5 | 24.0 | 24.5 | 25.0 | 25.5 | 26.0 | |
|---|---|---|---|---|---|---|---|---|---|---|
| 3 | × | × | × | × | × | o | o | × | × | high |
| 3.5 | × | × | × | × | × | o | o | × | × | ↑ |
| 3.8 | × | × | × | × | o | o | o | × | × | Stability |
| 4 | × | × | o | o | o | o | o | × | × | ↓ |
| 4.2 | × | × | o | o | o | × | × | × | × | low |
| 4.5 | × | × | o | o | × | × | × | × | × | | high ← Stability → low

FIG.6(b)

| Ru (A) \ Ferromagnetic film A (A) | 22.0 | 22.5 | 23.0 | 23.5 | 24.0 | 24.5 | 25.0 | 25.5 | 26.0 | |
|---|---|---|---|---|---|---|---|---|---|---|
| 3 | × | o | o | o | o | o | o | × | × | high |
| 3.5 | × | o | o | o | o | o | o | × | × | ↑ |
| 3.8 | × | o | o | o | o | o | o | × | × | Stability |
| 4 | × | o | o | o | o | o | o | × | × | ↓ |
| 4.2 | × | o | o | o | o | × | × | × | × | low |
| 4.5 | × | o | o | o | × | × | × | × | × | | high ← Stability → low

MAGNETORESISTIVE HEAD AND MANUFACTURING METHOD THEREOF

CROSS-REFERENCE TO RELATED APPLICATION

This application claims priority from Japanese Application No. 2003-086910, filed Mar. 27, 2003, the entire disclosure of which is incorporated by reference for all purposes.

BACKGROUND OF THE INVENTION

The present invention relates to a magnetoresistive (MR) head, a manufacturing method thereof, a magnetic reading/writing apparatus using the head, and a magnetoresistive (MR) sensor.

The following patent documents are referred to below by ordinal number, and are hereby incorporated by reference:
1. U.S. Pat. No. 5,159,513;
2. U.S. Pat. No. 5,583,725;
3. JP-A No. 2000-113418; and
4. JP-A No. 2000-20926.

In recent years, spin valve type magnetoresistive sensors have been used as the writing sensor in high density magnetic recording apparatuses. The spin valve sensor is disclosed in Patent Document 1 is an example.

The essential feature of the spin valve type magnetoresistive sensor is the basic constitution comprising a ferromagnetic film referred to as a pinned layer, a ferromagnetic soft magnetic layer referred to as a free layer, a conductive layer put between the two layers adjacent directly thereto, and an exchange coupling film in direct contact with the pinned layer (that is, a multi-layered constitution in the order of free layer, conductive layer, pinned layer and exchange coupling film) in which an anti-ferromagnetic material is usually used for the exchange coupling film. Further, the magnetoresistive sensor has electrodes for supplying current to the layers and a longitudinal bias layer for applying a longitudinal bias magnetic field for suppressing noises referred to as Barkhausen Noise caused by non-uniformity of the free layer magnetization. Usually, a Co-based permanent magnetic film is used for the longitudinal bias layer. The sensor is usually disposed in a minute space called a magnetic gap put between two ferromagnetic bodies referred to as magnetic shields and reads magnetization signals from a recording medium with high-resolution.

Magnetization of the pinned layer is fixed in a direction perpendicular to the recording medium opposed surface (magnetic head air bearing surface), that is, the pinned layer does not change its magnetization direction relative to the magnetic field of the medium and the magnetic field applied to the sensor film during reading. Magnetization in the free layer changes its direction in accordance with the magnetic field from the receding medium to cause a change in magnetic resistance due to a change formed in the angle between the magnetization of the pinned layer and the magnetization of the free layer. Generation of the resistance change as the signal is an operation principle of the spin valve type head.

The exchange coupling film is adjacent to the pinned layer and gives a strong bias magnetic field to the pinned layer. Since the magnetization of the pinned layer is fixed by the bias magnetic field, the magnetization direction is not changed by the magnetic field from the recording medium or the magnetic field from the recording head. An anti-ferromagnetic material is usually used for the exchange coupling film, and it is necessary that the exchange coupling magnetic field applied to the pinned layer is sufficiently large within the range of the operation temperatures of the sensor. To this end, a regular PtMn alloy having 1:1 platinum and manganese composition is commonly used.

Patent Documents 2 and 3 disclose a proposal for a constitution not having the exchange coupling film adjacent to the pinned layer.

The magnetoresistive sensor film is exposed to the medium opposed surface of the magnetic head for effectively sensing the magnetic field from magnetic bits recorded in the medium. In addition, the thus exposed magnetoresistive film is covered with an ABS protective film. To make the magnetic head in this constitution, the process for the constitution is divided into a step of forming devices on a substrate and a slider fabrication step of cutting out individual devices from the substrate on which devices are formed and fabricating each of them into a shape suitable for allowing it to fly above the recording medium, referred to as a slider. In the slider fabrication step, the substrate is cut out by machining into blocks called bars, in smaller units, each having a plurality of devices. The bar is polished by a polishing step referred to as a computer lapping to expose the magnetoresistive sensor to the medium opposed surface. The step is referred to as an air bearing surface fabrication step.

Further, Patent Document 4 discloses various results of studies of concrete constitution of a stacked pinned layer.

To achieve high recording density of 100 GB/in$^2$ class, it is necessary to miniaturize the magnetoresistive sensor film and miniaturization to about 0.1 μm track width×0.1 μm sensor height has been tried. The sensor height is a width in the direction perpendicular to the medium opposed surface of the sensor film. A significant problem in the course of miniaturization is that the pinned layer of the sensor film suffers from damage during air bearing surface fabrication for the sensor height to a size of 0.1 μm. The damage of the pinned layer is encountered in a region of 30 to 50 nm from the air bearing surface; if the sensor height is 0.1 μm (100 nm), 30 to 50% thereof are damaged. As a result, the change of the magnetic resistance of the sensor film is 30 to 50% of the value intended. Accordingly, the read signal is decreased by 30 to 50% while reading the recorded information of the medium and the information is read inaccurately.

As recording density is further increased, the sensor height will be further miniaturized and the problem will become more severe. Where the sensor height is 50 nm or less, the entire area of the sensor film can be damaged and the change in resistance of the sensor film can scarcely be obtained and, accordingly, this problem will be a significant concern for the future of high density recording.

The damage in the pinned layer encountered during air bearing surface fabrication may be caused by local temperature elevation of the sensor film due to the friction that occurs while scraping and polishing the ceramic slider material in the air bearing surface fabrication step. Damage may also occur from the spike-like large current generated in the sensor film while scraping the slider material, which applies a large magnetic field to the sensor film.

In the case of a head having a spin valve sensor film using PtMn for the exchange coupling film, it has been known that the damage in the pinned layer is not structural damage caused by diffusion of atoms in the film but damage in view of the magnetic structure since the damage is repaired when heated to 200° C. or higher in a strong magnetic field. However, this method cannot be adopted since exposure to high temperature has other effects such as the pole of the recording head protruding toward the air bearing surface. Therefore, it is difficult to attain higher recording density using the current technology.

Reversal of the magnetic moment in the pinned layer is also caused during air bearing surface fabrication in the existent spin valve type head without the exchange coupling film (disclosed in Patent Documents 2 and 3). In this head type, the reading output is not as greatly decreased as in the head using PtMn for the exchange coupling film as described above. If magnetic bits magnetized in an identical direction are read, there is a problem due to the different positive and negative signal output of the head.

SUMMARY OF THE INVENTION

Accordingly, there is a need to restore the original direction of the magnetic moment of the pinned layer that was reversed during air bearing surface fabrication. However, the patent documents listed above do not disclose a concrete technique for restoring the reversed magnetic moment. Further, while Patent Document 4 makes various studies of a "spin valve type head comprising a stacked pinned layer having an exchange coupling film," it does not disclose a concrete method for restoring damage in the magnetic structure of the pinned layer at room temperature or a concrete head constitution suitable for the restoration.

One aspect of the present invention is to provide a structure for a magnetoresistive sensor film, and a magnetic field application method capable of controlling the magnetization direction in a pinned layer by applying a magnetic field at room temperature. According to this aspect of the invention, damaged regions of the pinned layer caused during air bearing surface fabrication can be restored by applying an appropriate magnetic field at room temperature without heating the head.

A magnetoresistive head in one set of embodiments includes a pinned layer, a free layer, and a non-magnetic spacer film formed between the pinned layer and the free layer wherein the pinned layer has a first ferromagnetic film and a second ferromagnetic film anti-ferromagnetically coupled to each other by way of an anti-ferromagnetic coupling film. Within this set of embodiments, some embodiments are characterized by the first ferromagnetic film having a coercivity of 200 Oe or more and the second ferromagnetic film having a coercivity of 20 Oe or less. Also within this set of embodiments, some embodiments are characterized by the first ferromagnetic film having a composition within a range of: $Co_{100-X}Fe_X$ (at %) $40 \leq X \leq 80$, and the second ferromagnetic film having a composition within a range of: $Co_{100-Y}Fe_Y$ (at %) $0 \leq Y \leq 20$.

Any of these embodiments may be characterized by one or more of the following:
  the anti-ferromagnetic coupling film is formed of Ru and has a thickness within a range from 3.0 to 4.0 Å;
  a relation between an imaginal thickness DA0 of the first ferromagnetic film that has a magnetic moment equal to a magnetic moment of the second ferromagnetic film and a thickness DA of the first ferromagnetic film satisfies $0.0227 \leq (DA-DA0)/DA0 \leq 0.136$;
  the magnetic moment of the first ferromagnetic film is larger than that of the second ferromagnetic film; and/or
  a layer in contact with the first ferromagnetic film is formed from one of Ru, Ta, Cu, and NiFeCr.

Any of the foregoing embodiments may be characterized by one or more of:
  the free layer being on the side of a substrate and the pinned layer being on a side remote from the substrate relative to the free layer, with the magnetoresistive head having an underlayer adjacent to the free layer, and the underlayer having an NiFeCr layer on the side of the substrate; and/or
  the pinned layer being on the side of the substrate and the free layer being on a side remote from the substrate relative to the pinned layer, with an underlayer adjacent to the first ferromagnetic film on the side of the substrate comprising a stack of NiFeCr and Ru, a stack of NiFeCr, Ru, and NiFe, or a stack of NiFeCr, Ru, NiFe and Cu, in order from the side of the substrate; and/or
  the fixed layer being on the side of a substrate and the free layer being on a side remote from the substrate relative to the fixed layer, with an underlayer adjacent to the first ferromagnetic film on the side of the substrate comprising a stack of NiFeCr, NiFe, PtMn and Ru, or a stack of NiFeCr, NiFe, PtMn and Cu, in order from the side of the substrate.

A magnetoresistive head in another set of embodiments includes a first pinned layer, a second pinned layer, a free layer, a non-magnetic spacer film formed between the first pinned layer and the free layer, and another non-magnetic spacer film formed between the second pinned layer and the free layer, wherein each of the first and the second pinned layers has a first ferromagnetic film and a second ferromagnetic film anti-ferromagnetically coupled with each other by way of an anti-ferromagnetic coupling film. Within this set of embodiments, some embodiments are characterized by the first ferromagnetic film having a coercivity of 200 Oe or more and the second ferromagnetic film having a coercivity of 20 Oe or less. Also within this set of embodiments, some embodiments are characterized by each of the first ferromagnetic films disposed in each of the first pinned layer and the second pinned layer having a composition within a range of: $Co_{100-X}Fe_X$ (at %) $40 \leq X \leq 80$, and the second ferromagnetic film having a composition within a range of: $Co_{100-Y}Fe_Y$ (at %) $0 \leq Y \leq 20$.

Any of these embodiments may be characterized by one or more of the following:
  each of the anti-ferromagnetic coupling films of the first pinned layer and the second pinned layer is formed of Ru and has a thickness within a range from 3.0 to 4.0 Å;
  a relation between an imaginal thickness DA0 of the first ferromagnetic film that has a magnetic moment equal to a magnetic moment of the second ferromagnetic film and a thickness DA of the first ferromagnetic film satisfies $0.0227 \leq (DA-DA0)/DA0 \leq 0.136$;
  the magnetic moment of the first ferromagnetic film is larger than that of the second ferromagnetic film; and/or
  a layer in contact with the first ferromagnetic film is formed from one of Ru, Ta, Cu, and NiFeCr.

A further aspect of the invention provides a method of manufacturing a magnetoresistive head comprising a pinned layer having a first ferromagnetic film and a second ferromagnetic film anti-ferromagnetically coupled with each other by way of an anti-ferromagnetic coupling film, a free layer and a permanent magnet film disposed at an end of the free layer. In accordance with this aspect, the method comprises a first magnetic field application step of applying a magnetic field in a desired direction different from a direction of a magnetic moment magnetized to the pinned layer, and a second magnetic field application step of applying a magnetic field in a direction different from the direction of the magnetic field application in the first magnetic field application step.

In a specific implementation, the following relation is satisfied:

$$H1 \geq 0.4Hs$$

$$Hc \leq H2 \leq 0.35Hs,$$

where Hs is a saturation magnetic filed that brings respective magnetic moments of the first ferromagnetic film and the second ferromagnetic film antiparallel to each other into a parallel state, Hc is the coercivity of the permanent magnetic layer, H1 is a magnitude of an application magnetic field in the first magnetic field application step, and H2 is a magnitude of an application magnetic field in the step of applying the second magnetic field.

In a further aspect of the present invention a magnetoresistive head based on a spin valve effect comprises: a stacked type pinned layer formed on a substrate and having two films, i.e., a ferromagnetic film A and a ferromagnetic film B anti-ferromagnetically coupled to each other, and an anti-ferromagnetic coupling film for separating the two ferromagnetic films A and B at their film surfaces and coupling respective magnetic moments of the ferromagnetic films A and B in an anti-parallel state; a non-magnetic spacer film formed adjacent to the film surface of the ferromagnetic film B of the stacked pinned layer; a ferromagnetic film, having a soft magnetic property, formed adjacent to the film surface of the non-magnetic spacer film; a permanent magnet film having an underlayer formed so as to be adjacent, at the layer cross section, to a spin valve film fabricated into a predetermined shape comprising the stacked pinned layer, the non-magnetic spacer film and the ferromagnetic film, and an electrode film adjacent, at the film surface, to the permanent magnet film, in which a predetermined difference in coercivity is provided between the ferromagnetic film A and the ferromagnetic film B.

It is preferred that the coercivity of the single ferromagnetic film A is 200 Oe or more and the coercivity of the single ferromagnetic film B is 20 Oe or less.

Further, to define the coercivities of the single ferromagnetic film A and the single ferromagnetic film B within the range as described above, compositional ranges are made to satisfy the following formulae:

Composition for the ferromagnetic film A: $Co_{100-Y}Fe_Y$(at %) $80 \geq Y \geq 40$ Composition for ferromagnetic film B: $Co_{100-Y}Fe_Y$(at %) $20 \geq Y \geq 0$ Further, to further increase the coercivity of the ferromagnetic film A, it is desired that a layer in direct contact with the ferromagnetic film A is one of Ru, Ta, Cu, and NiFeCr.

To increase the coupling strength of the ferromagnetic film A and the ferromagnetic film B in an anti-parallel state, and to make it sufficiently stable to the medium magnetic field or recording magnetic field during actual use of the pinned layer, it is preferred that the anti-ferromagnetic coupling film is made of Ru and its film thickness is from 3.0 to 4.0 Å.

Further, the magnetic moment of the ferromagnetic film A is made larger than that of the ferromagnetic film B. This can restore the damage to the pinned layer caused during air bearing surface fabrication by application of appropriate magnetic field.

In a further aspect of the invention, the application of appropriate magnetic field to restore the damage to the pinned layer, the following two-step magnetic field application is performed. That is, a first magnetic field application step of applying a magnetic field in a direction perpendicular to the air bearing surface of a magnetic head and in a desired direction of the magnetic moment of the ferromagnetic film A and a second magnetic field application step of applying a magnetic field in the direction of the head track width in parallel with the air bearing surface are performed.

Assuming the saturation magnetic field of the magnetic moments of the ferromagnetic film A and the ferromagnetic film B directed in anti-parallel to each other as Hs, the magnitude of the application magnetic field in the first magnetic field application step as H1, and the magnitude of the application magnetic field in the second magnetic field application step as H2, H1 and H2 are set so as to satisfy the following relations:

$$H1 \geq 0.4Hs, \text{ and}$$

$$Hc \leq H2 \leq 0.35Hs.$$

A further understanding of the nature and advantages of the present invention may be realized by reference to the remaining portions of the specification and the drawings.

BRIEF DESCRIPTION OF THE DRAWINGS

FIG. 3 illustrates graphs showing the temperature change of the anti-ferromagnetic coupling saturation magnetic field (Hs) of a stacked type pinned layer.

FIGS. 6(a) and 6(b) illustrate tables showing the results of examining the constitution of a spin valve film capable of controlling the magnetization direction of a pinned layer by the two-step magnetic field application shown in FIG. 5 while varying the thickness of the anti-ferromagnetically coupling film (Ru) and the ferromagnetic film A (Co 50 at %

Fe). Symbol "O" indicates a controllable constitution. FIG. 6(a) shows the result in a case where the level of a first stage magnetic field H1 is 10,000 Oe and FIG. 6(b) shows a result in a case where H1 is 14,000 Oe.

DESCRIPTION OF SPECIFIC EMBODIMENTS

Preferred embodiments of the present invention will be described in detail with reference to the drawings.

Embodiment 1

A first embodiment is generally applicable to such a device for detecting external magnetic fields as a sensor, and it is particularly useful as a read head for information write and read systems. In this case, information is recorded as arrangement of magnetic domains on a magnetic medium. The magnetic medium may be of any type, such as a magnetic tape, a magnetic drum, and one or more hard disks. The magnetic domains are usually arranged along a track, and the track includes a circular, spiral, helical or indefinite length constitution.

Figure 13:
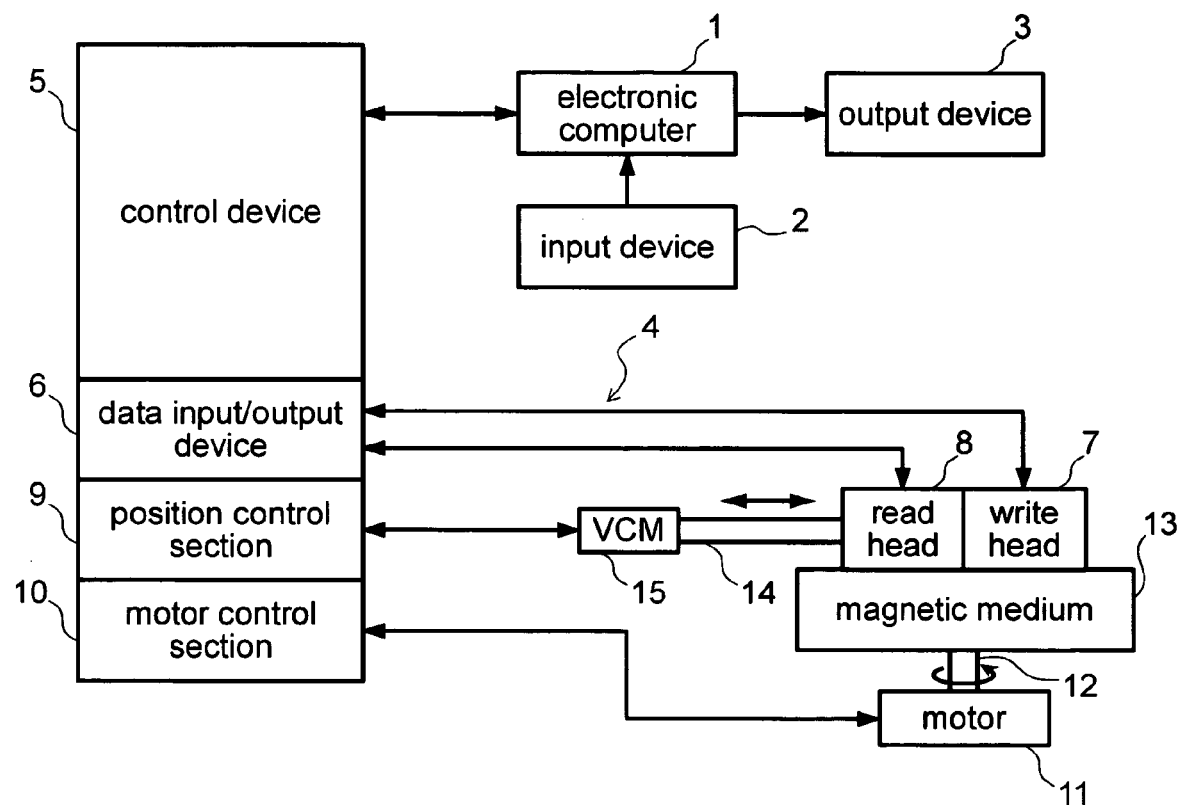
FIG. 13 is a diagram illustrating the outline of a magnetic read and write apparatus according to the embodiment of the present invention.

FIG. 13 shows an example of typical information write and read apparatus. An electronic computer 1 receives input information from a network, a keyboard, a scanner or other similar devices by way of an input device 2 having one or a plurality of interfaces disposed therebetween. The computer 1 can be connected with one or a plurality of input devices 2 and, in addition, can output to one or a plurality of output devices 3. Examples of the output device 3 could conceivably include a network, a printer, a display device and a modem to be connected with the computer by way of an interface. The computer writes information to a magnetic recording apparatus 4 as peripheral equipment or reads information from the magnetic recording apparatus in addition to other recording apparatus related with the computer 1.

The magnetic recording apparatus includes the following internal devices:

(1) A control device 5 that outputs information signals to a write head 7, and receives information from a read head 8. The apparatus further includes a data input/output section 6 for receiving feed back signals from the head.

(2) A head position control section 9 that outputs head position control signals and receives head position detection signals.

(3) A motor control section 10 that controls operation for speed, stopping and starting with respect to the motion of the magnetic medium 13 relative to the heads. In this embodiment, the motor control section 10 outputs rotation control signals to a motor 11 for rotating one or a plurality of disk type magnetic recording media 13 by way of a shaft 12. A transducer having the write head 7 and the read head 8 constituting a magnetic head usually moves in the radial direction of the disk by using a connection arm 14 and a voice coil motor (VCM) 15 so as to be in slight contact with the disk 13 or caused to fly above the disk with a slight distance kept therefrom.

Figure 14:
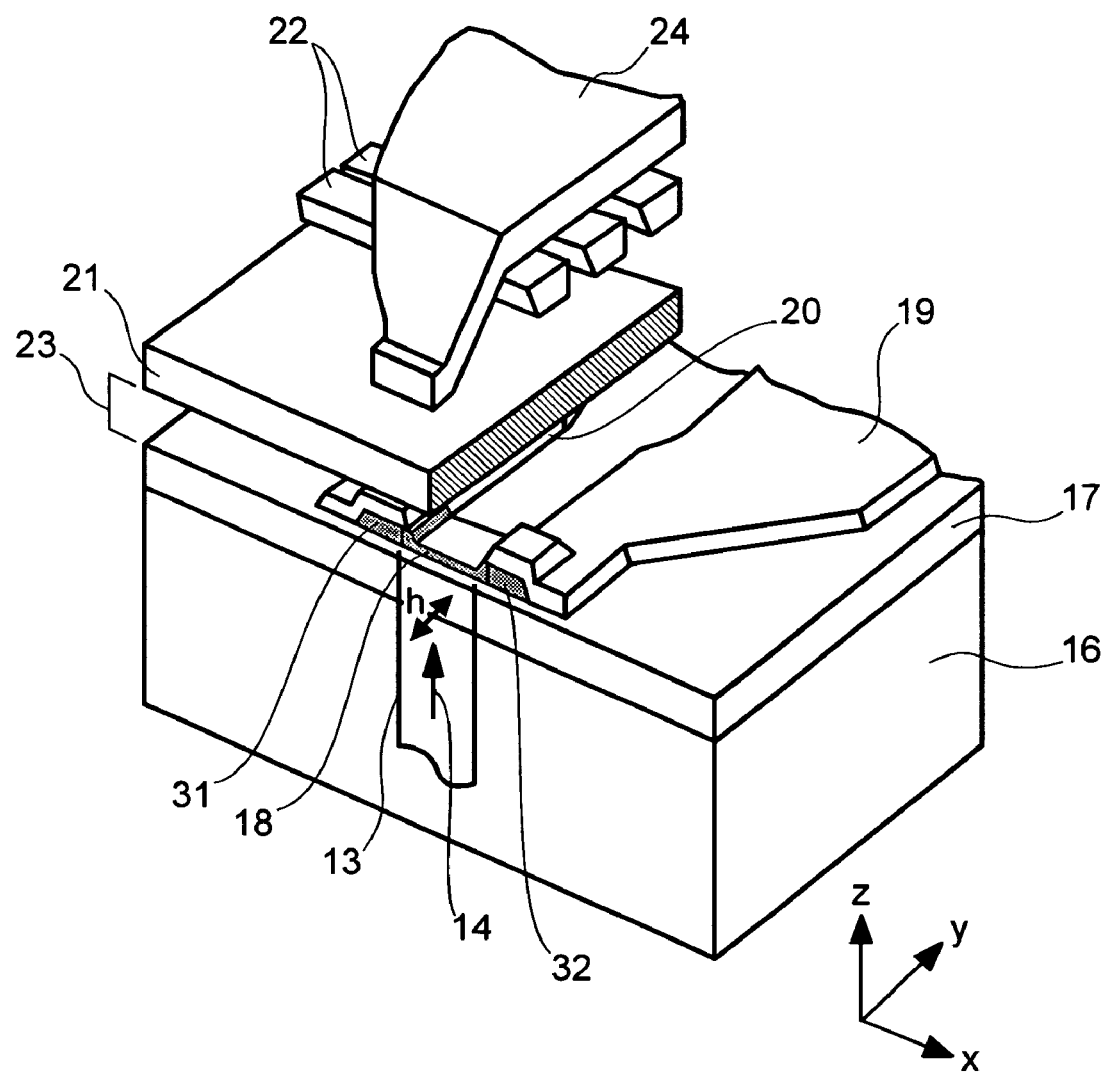
FIG. 14 is a view showing a magnetic head for used in a magnetic read and write apparatus using a spin valve sensor according to the present invention.

As described above, the data recording apparatus shown in FIG. 13 is merely a representative example. Since the operation of the apparatus shown in FIG. 13 is self evident, the details thereof are not described here. This embodiment has a feature in the constitution of the read head 8 in FIG. 13. FIG. 14 shows a concrete structure of the read head 8. FIGS. 13 and 14 show that a portion of the magnetic medium 13 moves in a direction 14 relative to the reading head 8 moving along axis Z. The VCM 8 moves the read head 8 along axis X to access a track of aimed magnetic domains, while the track of the magnetic domains usually moves along axis Z adjacent to the read head 8. The magnetic medium 13 has a plurality of magnetic domains along the track in the direction of axis Z. The magnetic medium 13 has a plurality of magnetic domains along the track in the direction of axis Z. In addition, the magnetic field h of the magnetic domains changes along the axis Y of the read head as the VCM 15 relatively moves along axis Z. Further, fluctuation of the magnetic field is read out.

The writing head 7 and the reading head 8 each comprises a plurality of layers and a portion of the constitution is shown in FIG. 14 in which several conventional layers such as a coupling film and a passivation layer are not illustrated.

In the manufacturing steps, a substrate 16 is at first provided and, after depositing a shield 17 thereon, a reading sensor 18 is grown further thereon and, finally, a read current input electrode 19 and a read current output electrode 20 are deposited thereabove to form a read head as a single piece.

Further, an upper shield 21 or a lower core 21 (the lower core also serves as the upper magnetic shield) is deposited and then, coils 22 are deposited, on which an upper magnetic core 24 is formed. For example, it is more preferred to form a dielectric layer 23 comprising alumina between the sensor film 18 and the lower shield 17 and between the sensor film 18 and the upper shield. Permanent magnet films 31, 32 providing a longitudinal bias magnetic field are located on both sides of the spin valve film 18 as the reading sensor film.

For the substrate 16, ceramics or ceramics on which a dielectric layer is deposited can be used. For the upper and lower magnetic shields 21 and 17, permalloy, sendust or Co-based amorphous material showing soft magnetic property, or microcrystal system ferromagnetic material exhibiting soft magnetic property can be used.

The structure shown in FIG. 14 adopted in this embodiment is generally known and the embodiment of the invention concerns a constitution of the reading sensor 18 and a manufacturing method thereof. The reading head has a constitution suitable to giving and receiving information to and from the magnetic medium. The reading sensor has a constitution suitable to detect not only information from the magnetic medium but also the external magnetic fields.

Figure 9:
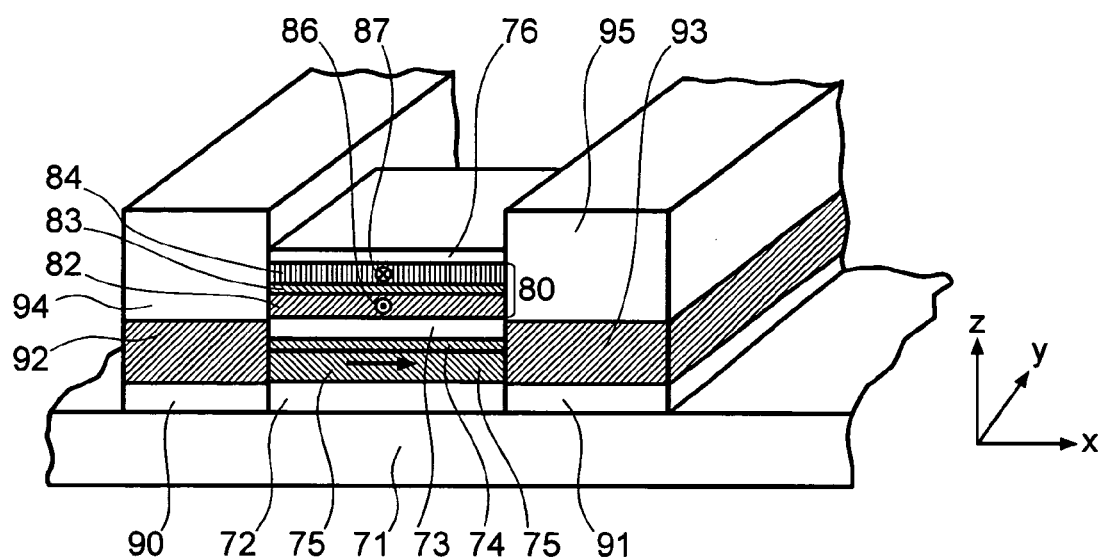
FIG. 9 is a view showing a structure, different from that of FIG. 8, of a spin valve type magnetoresistive sensor using a stacked type pinned layer.

FIG. 9 shows a concrete constitution of a reading sensor according to the embodiment of the invention and a description is to be made with reference to the constitution of FIG. 9 although the details thereof will be described later. A spin valve film 18 has a first ferromagnetic film that is relatively likely to response to magnetic fields (hereinafter referred to as a free layer, which corresponds, for example, to a CoFe film 74 and a permalloy film 75), a second ferromagnetic film that relatively less likely to response to the magnetic fields (hereinafter referred to as a pinned layer, which corresponds to a stacked pinned layer 80), and a conductive non-magnetic spacer film therebetween (for example, corresponding to Cu film 73). Further, it has an underlayer for controlling the crystal form to increase the resistance change below the free layer (for example, corresponding to the underlayer 72 of a two-layered NiFeCr/Ru constitution). Further, it has a cap layer (for example, corresponding to two-layered Ru/Ta constitution cap 76) on the pinned layer 80.

In this embodiment, a stacked pinned layer 80 in which two ferromagnetic films (for example, corresponding to ferromagnetic film A 84 and ferromagnetic film B 82) and an anti-ferromagnetic coupling film (for example, corresponding to a Ru film 83) disposed therebetween are used as the pinned layer 80 provides a constitution that functions as a spin valve type read head for use in magnetic recording apparatus. This constitution has no exchange coupling film adjacent to the pinned layer.

It is important to ensure the stability of magnetization of the stacked pinned layer 80 to the external magnetic field and to control the direction of the magnetization. The constitution and the method for attaining them are to be described. Patent Document 3 describes that the anisotropic magnetic field is increased so as to ensure the stability for the external magnetic field. In contrast, to improve the stability in this embodiment, the coercivity of the ferromagnetic film A constituting the stacked pinned layer is increased to thereby ensure the stability. The coercivity is an index that expresses the reversal level of magnetization of a magnetic body encountered when a magnetic field is applied to it from the outside; the larger the coercivity, the greater the stability of the external magnetic field is improved.

To increase the coercivity of the ferromagnetic film A or the ferromagnetic film B, the dependence of CoFe alloy on Fe composition was examined. Since it is difficult to measure the coercivity of the ferromagnetic film A or B alone in the spin valve constitution shown in FIG. 9, a film of the following constitution was prepared and the dependence of the coercivity of the CoFe alloy on the Fe composition was examined. After exposing the surface of the glass substrate to Ar plasma for cleaning, a spin valve film (spin valve film for measuring CoFe film) was prepared in the following order:

Glass substrate/CL (CL means cleaning);
Underlayer: NiFeCr 32 Å/NiFe 8 Å;
Exchange coupling film: PtMn 140 Å;
Ferromagnetic film A: CoFe 18 Å;
Anti-ferromagnetic coupling film: Ru 5 Å;
Ferromagnetic film B: CoFe 25 Å;
Non-magnetic spacer film: Cu 25 Å;
Free layer (film to be measured): Co—X at % Fe 20 Å; and
Cap.

In the spin valve film described above, the dependence of the coercivity of the CoFe alloy layer on the Fe composition was examined by using several kinds of caps. The caps used include seven types, i.e., (1) Cu 10 Å/Ta 20 Å, (2) Ta 20 Å, (3) NiFeCr 30 Å, (4) Cu 10/NiFeCr 30 Å, (5) Ru 10 Å/Ta 20 Å, (6) Ru 10 Å/NiFeCr 30 Å, and (7) PtMn 30 Å/Ta 20 Å.

Figure 1:
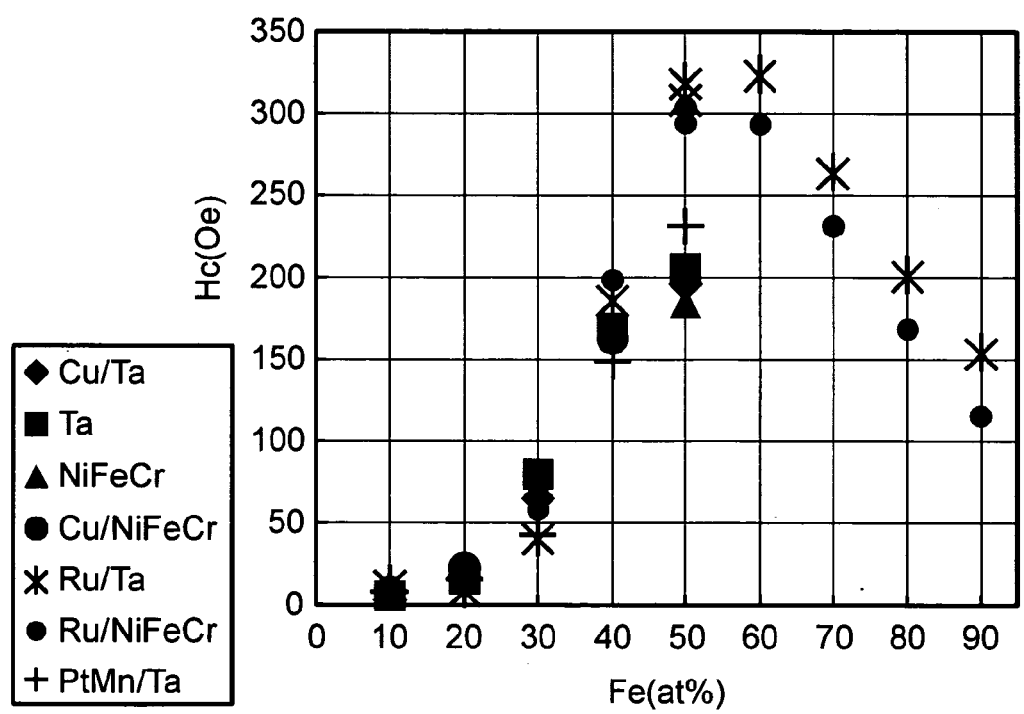
FIG. 1 is a graph examining the dependence of the coercivity of a ferromagnetic film A on the Fe composition on various cap layers.

FIG. 1 shows the result for the dependence of the coercivity on the Fe composition. Irrespective of the types of cap, coercivity increases along with increase in the Fe composition. In the cases of Ru/Ta cap and Ru/NiFeCr cap, the coercivity reaches a maximum value 300 Oe at Fe composition of 50 at % and the coercivity lowers as the Fe composition increases further. In the cases of Ta cap, NiFeCr cap, Cu/NiFeCr cap and PtMn/cap, the coercivity at Fe 50 at % is 200 Oe. The results of FIG. 1 show a case where the Fe composition X of the layer to be measured (Co—X at % Fe) is within a range from 40 at % to 80 at %, a CoFe film having high coercivity of 150 Oe or higher irrespective of the types of cap, or having high coercivity of 200 Oe or higher depending on the types of cap can be obtained. Further, in a case where the Fe composition X of the layer to be measured (Co—X at % Fe) is within a range from 0 at % to 20 at %, a CoFe film having low coercivity of 30 Oe or lower irrespective of the types of cap, or having low coercivity of 20 Oe or lower depending on the types of cap can be obtained. The constitution has an exchange coupling film made of a PtMn anti-ferromagnetic material and a CoFe alloy layer to be examined is used as the free layer. Since the coercivity of the CoFe alloy layer alone can be examined by using the same for the free layer, such a constitution is used.

Then, in this embodiment, a composition "Co 50 at % Fe" is selected as a composition of higher coercivity, and a composition "Co 10 at % Fe" is selected as a composition of lower coercivity and the following three types of spin valve film constituting the ferromagnetic film A and the ferromagnetic film B by the combination of the compositions described above were prepared and the thickness of the ferromagnetic film A was changed between 20 to 30 Å in 1 Å steps and stability for the external magnetic field and a change in resistance were determined.

① Combination 1

A spin valve film using Co 50 at % Fe for both ferromagnetic film A and ferromagnetic film B:
  Glass substrate/CL;
  Underlayer: NiFeCr 42 Å/Ru 4.5 Å;
  Free layer: NiFe 20 Å/CoFe 10 Å;
  Non-magnetic spacer film: Cu 20 Å;
  Ferromagnetic film B: Co 50 at % Fe 25 Å;
  Anti-ferromagnetic coupling film: Ru 3.5 Å;
  Ferromagnetic film A: Co 50 at % Fe X Å (X=20–30); and
  Cap: Ta 20 Å.

② Combination 2

A spin valve film using Co 50 at % Fe for ferromagnetic film A and Co 10 at % Fe for ferromagnetic film B:
  Glass substrate/CL;
  Underlayer: NiFeCr 42 Å/Ru 4.5 Å;
  Free layer: NiFe 20 Å/CoFe 10 Å;
  Non-magnetic spacer film: Cu 20 Å;
  Ferromagnetic film B: Co 10 at % Fe 25 Å;
  Anti-ferromagnetic coupling film: Ru 3.5 Å;
  Ferromagnetic film A: Co 50 at % Fe X Å (X=20–30); and
  Cap: Ta 20 Å.

③ Combination 3

A spin valve film using Co 10 at % Fe for both ferromagnetic film A and ferromagnetic film B:
  Glass substrate/CL;
  Underlayer: NiFeCr 42 Å/Ru 4.5 Å;
  Free layer: NiFe 20 Å/CoFe 10 Å;
  Non-magnetic spacer film: Cu 20 Å;
  Ferromagnetic film B: Co 10 at % Fe 25 Å;
  Anti-ferromagnetic coupling film: Ru 3.5 Å;
  Ferromagnetic film A: Co 10 at % Fe X Å (X=20–30); and
  Cap: Ta 20 Å.

The coercivity of Co 10 at % Fe is about 10 Oe. In addition, the coercivity of Co 50 at % Fe is 200 Oe since it corresponds to a case where Co 50 at % Fe is adjacent to Ta as a result of the examination described above. During deposition of the ferromagnetic film A, anti-ferromagnetic coupling film (Ru) and the ferromagnetic film B, a constant magnetic field (for example at a level of 70 Oe) was applied in the direction of depth (direction perpendicular to the direction of an air bearing surface).

Figure 2A:
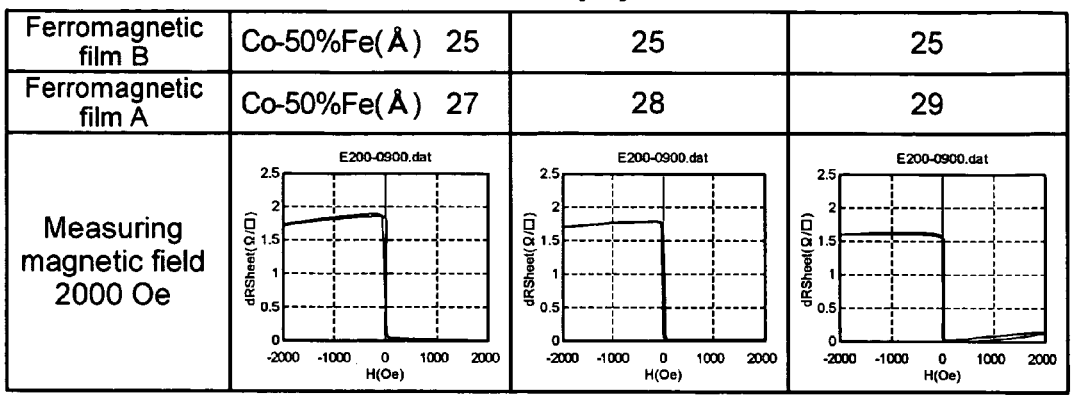
FIG. 2(a) is an example of transfer curves showing a relation between the magnetic field of a spin valve film and the change of resistance when using Co 50 at % Fe for both a ferromagnetic film A and a ferromagnetic film B.

FIG. 2(a) shows an example of transfer curves at 2000 Oe for the spin valve film ① using the ferromagnetic film A and the ferromagnetic film B both of Co 50 at % Fe (Combination 1). The structure is most stable for the external magnetic field when the thickness of the ferromagnetic film A is 28 Å and the magnitude of the magnetic moment is equal between the ferromagnetic film A and the ferromagnetic film B. The figure also shows transfer curves for the spin valve film for ±1 Å around 28 Å with respect to the thickness of the ferromagnetic film A. Also within the range (28±1 Å), hysteresis is not caused in the measuring magnetic field at 2000 Oe and it is stable for the external magnetic field of 2000 Oe. The resistance change is 1.7 to 9 Ω/□, which is a lower value compared with the constitution of the spin valve film ② (Combination 2) shown below.

Figure 2B:
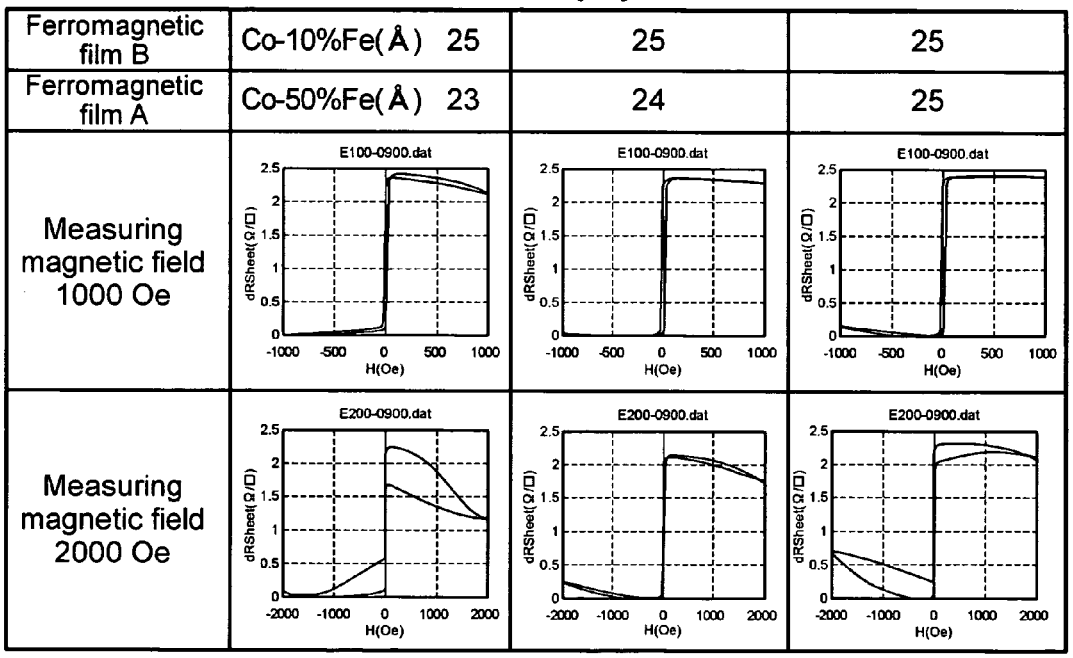
FIG. 2(b) is an example of transfer curves showing a relation between the magnetic field and the resistance change of a spin valve film in a case of using Co 50 at % Fe for the ferromagnetic film A and using Co 10 at % Fe for the ferromagnetic film B.

FIG. 2(b) shows an example of transfer curves for the spin valve film ② using the ferromagnetic film A of Co 50 at % Fe and the ferromagnetic film B of Co 10 at % Fe. It is most stable for the external magnetic field when a thickness of the ferromagnetic film A is 24 Å and the magnitude of the magnetic moment is equal between the ferromagnetic film A and the ferromagnetic film B. The figure also shows transfer curves for the spin valve film in a case of ±1 Å around 24 Å with respect to the thickness of the ferromagnetic film A. No hysteresis occurs with a measuring magnetic field of 1000 Oe and it is stable for the external magnetic field at 1000 Oe. No hysteresis occurs with a 24 Å ferromagnetic film A even in a measuring magnetic field of 2000 Oe and it exhibits characteristic of good stability. Hysteresis occurs at 23 Å and 25 Å where the pinned layer causes irreversible change and the durability to the external magnetic field is deteriorated compared with the constitution ①. This is because the coercivity of the ferromagnetic film B in ② is about 10 Oe, which is lower compared with coercivity 200 Oe of the ferromagnetic film B in ①. The change of resistance in the constitution ② is 2.3 to 2.5 Ω/□ and the value of the resistance change is improved compared with the constitution ①.

Figure 2C:
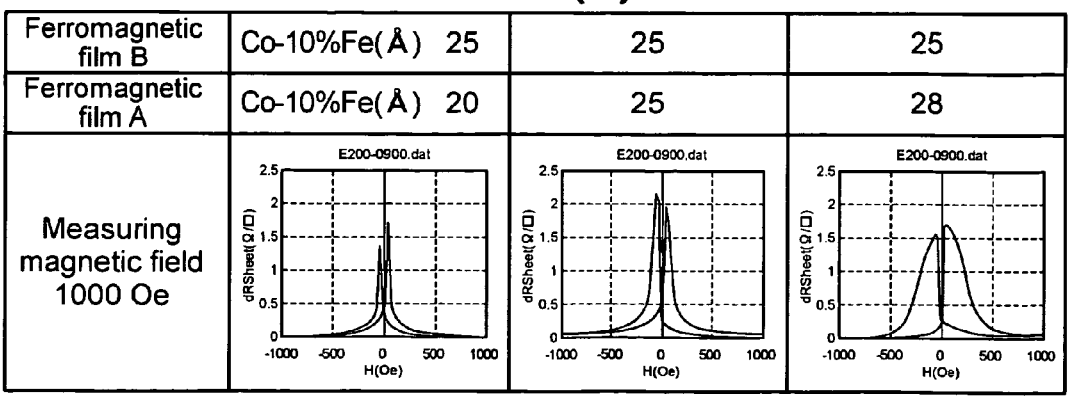
FIG. 2(c) is an example of transfer curves showing a relation between the magnetic field and the change of resistance of a spin valve film in a case of using Co 10 at % Fe for both the ferromagnetic film A and the ferromagnetic film B.

FIG. 2(c) shows transfer curves for the spin valve layer using ③ ferromagnetic film A and ferromagnetic film B both of Co 10 at % Fe, at a measuring magnetic field of 1000 Oe. When the thickness of the ferromagnetic film A was changed between 20 and 30 Å in 1 Å steps, each loop shows large hysteresis (typical examples are shown in the figure) and the pinned layer of this constitution is instable and incapable of withstanding the magnetic field of even 500 Oe. As also described in Patent Document 3, since a magnetic field durability of 1000 Oe may be sufficient when considering the magnetic field of the medium, the durability to the external magnetic field of the pinned layer is at a sufficient level in the constitution ① and the constitution ②. Further, in view of the large resistance change, a constitution of the spin valve film ② using Co 50 at % Fe for the ferromagnetic film A and using a composition with less Fe composition of about Fe 10 at % for the ferromagnetic film B (Combination 2) is suitable.

In view of the above, the following spin valve film (a) constituted by using the ferromagnetic film B of Co 10 at % Fe and changing the Fe composition in the ferromagnetic film A was prepared and the coercivity of the ferromagnetic film A was changed by changing Y.

Spin valve film (a):
  Glass substrate/CL;
  Underlayer: NiFeCr 42 Å/Ru 4.5 Å;
  Free layer: NiFe 20 Å/CoFe 10 Å;
  Non-magnetic spacer film: Cu 20 Å;
  Ferromagnetic film B: Co 10 at % Fe 25 Å;
  Anti-ferromagnetic coupling film: Ru 3.5 Å;
  Ferromagnetic film A: Co Y at % Fe 24 Å (Y=10–90); and
  Cap: Ta 20 Å.

A pinned layer stable for the external magnetic field of 1000 Oe or more is examined for Y in the range from 10 to 90 in the spin valve film. As a result, it has been found that a spin valve film having a pinned layer stable for the external magnetic field of 1000 Oe can be attained with good reproducibility at the coercivity of the ferromagnetic film A of 200 Oe or higher. While the thickness of the layer constituting the stacked pinned layer varies when film deposition is repeated many times, "with good reproducibility" means that the durability to the magnetic field of 1000 Oe or higher can be obtained with good reproducibility even with the variations. In view of FIG. 1, the Fe compositional range for the ferromagnetic film A (CoFe) in which the value of the coercivity is 200 Oe or greater is from 40 to 80 at %.

Figure 19:
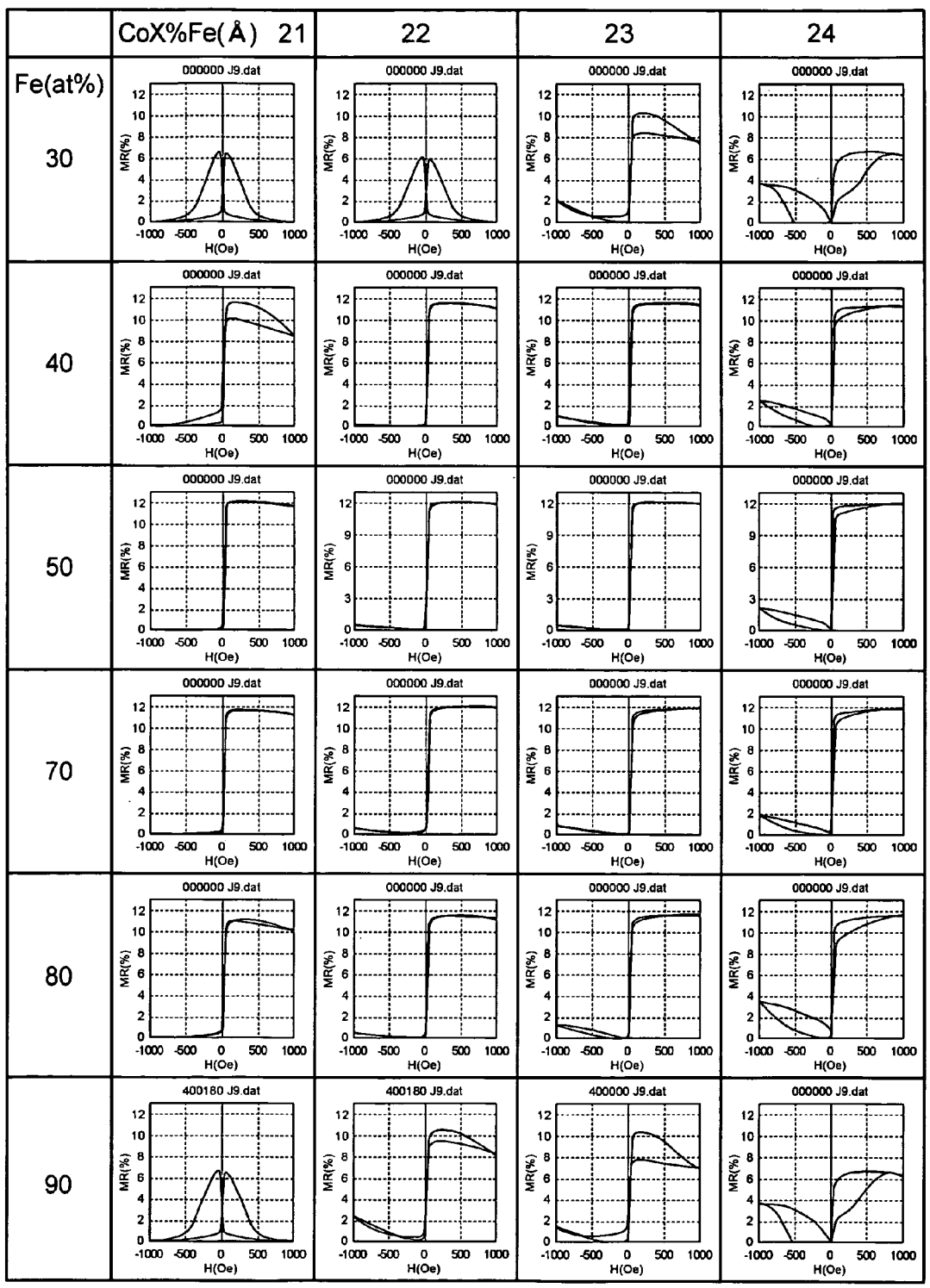
FIG. 19 is a graph showing transfer current curves in a case of changing the Fe composition and the film thickness of the ferromagnetic film A (thickness of the ferromagnetic film B is 25 Å).
Figure 20:
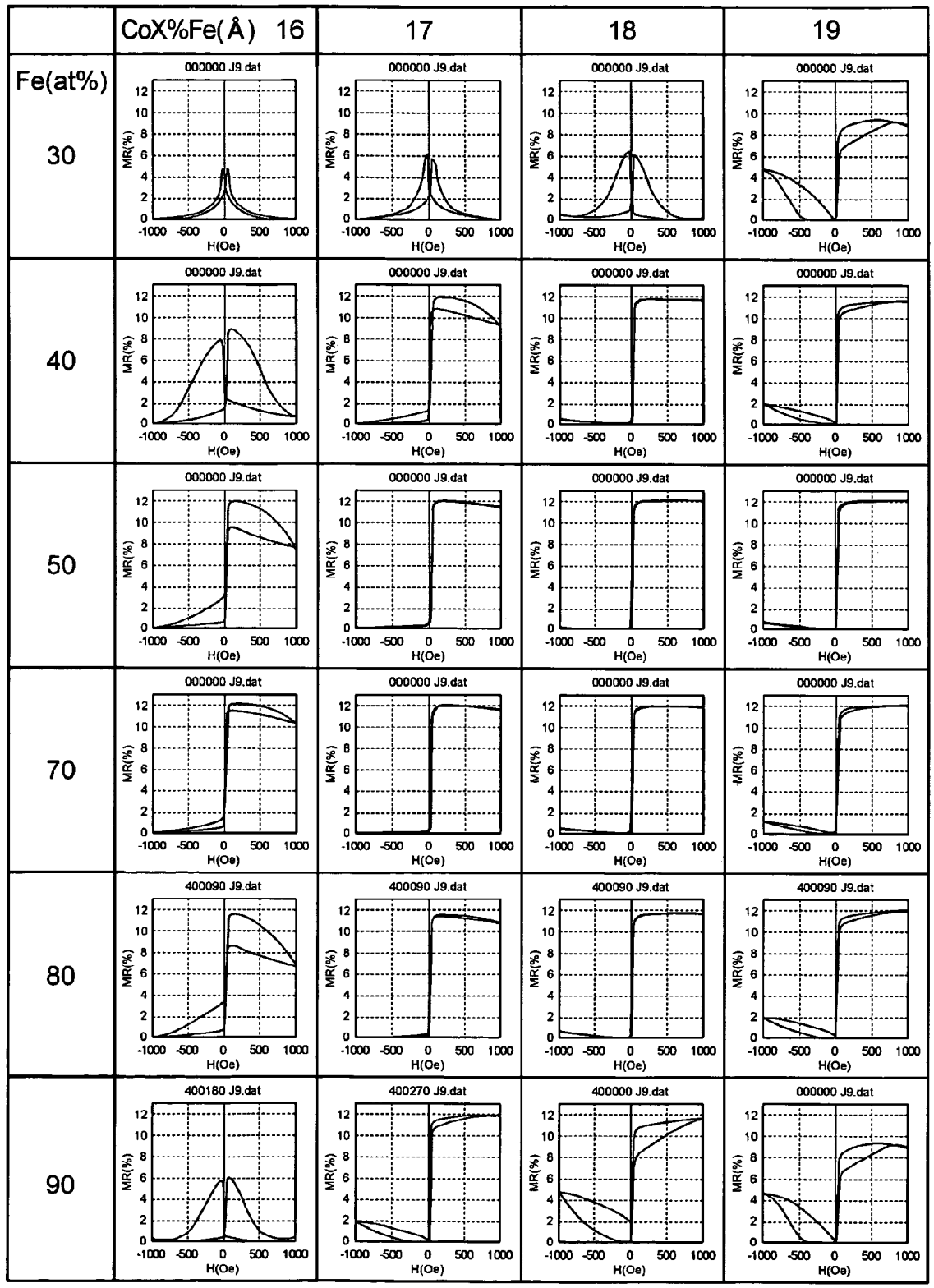
FIG. 20 is a graph showing transfer curves in a case of changing the Fe composition and the film thickness of the ferromagnetic film A (the thickness of the ferromagnetic film B is 20 Å).

FIGS. 19 and 20 show graphs for transfer curves with respect to other spin valve films (b) and (c) in a case where a magnetic field of 1000 Oe was applied from the outside within a range of: Y=10–90. The constitution for the spin valve films (b) and (c) is as described below.

Spin valve film (b):
  Glass substrate;
  Underlayer: NiFeCr 42 Å/Ru 4.5 Å;
  Free layer: NiFe 5 Å/CoFe 15 Å;
  Non-magnetic spacer film: Cu 19 Å;
  Ferromagnetic film B: Co 10% Fe 25 Å;
  Anti-ferromagnetic coupling film: Ru 3.5 Å;
  Ferromagnetic film A: Co—X % Fe Y Å; and
  Cap: Ru 5 Å/Ta.

FIG. 19 shows resistance change curves for an external magnetic field of 1000 Oe in a case where X is changed within a range from 30 to 90 and Y is changes within a range from 21 to 24 in the spin valve film (b). Within the limited range of the Fe composition varying from 40 to 80%, curves with no hysteresis can only be obtained at a position near where the thickness of the ferromagnetic film A is at X=22 Å. However, over the full range of the Fe composition varying from 30% to 90%, hysteresis does occurs no matter how Y is changed and therefore is not stable in a magnetic field of 1000 Oe. Accordingly, durability in a magnetic field of 1000 Oe or more can be obtained by controlling the Fe composition to a level of 40 to 80%. Within this range of Fe composition of 40% to 80%, the coercivity (Hc) is 200 Oe or more as demonstrated in FIG. 1.

Spin valve film (c):
  Glass substrate;
  Underlayer: NiFeCr 42 Å/Ru 4.5 Å;
  Free layer: NiFe 5 Å/CoFe 15 Å;
  Non-magnetic spacer film: Cu 19 Å;
  Ferromagnetic film B: Co 10% Fe 20 Å;
  Anti-ferromagnetic coupling film: Ru 3.5 Å;
  Ferromagnetic film A: Co—X % Fe Y Å; and
  Cap: Ru 5 Å/Ta.

FIG. 20 shows resistance change curves to the external magnetic field of 1000 Oe in the spin vale layer (c) in a case where X was changed within a range from 30 to 90 and Y was changed within a range from 21 to 24 in the same manner. This is different from the spin valve film (b) in that the thickness of the ferromagnetic film B (Co 10% Fe) is changed from "25 Å" to "20 Å". In the same manner as the result of FIG. 19, it can be seen that 40 to 80% is appropriate to the range of the Fe composition. In this case, it can be seen that the waveform with no hysteresis appears at a position near the thickness of the ferromagnetic film A of about 17 Å, and durability to the magnetic field of 1000 Oe or more can be obtained by controlling the Fe composition in the ferromagnetic film A to 40 to 80%. In view of this embodiment, the thickness of the ferromagnetic film B in the stacked pinned layer 80 is effective in the range from 20 Å to 25 Å. Magnetic field durability with no hysteresis could be obtained also within a range of the thickness of the ferromagnetic film B from 15 Å to 35 Å by controlling the Fe composition in the ferromagnetic film A to 40 to 80% in view of the result of a similar experiment (not illustrated).

Figure 15:
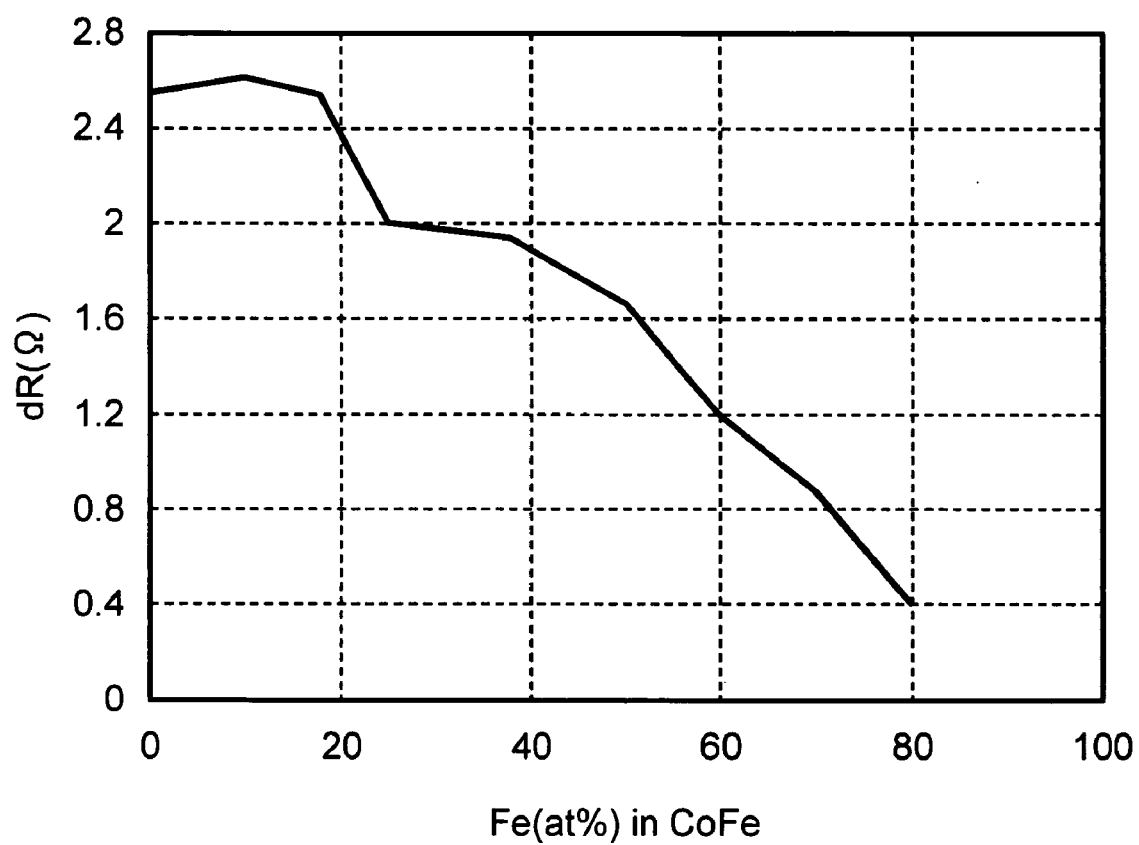
FIG. 15 is a graph showing a relation between the Fe compositional ratio and the resistance change of the ferromagnetic film B.

Further, to examine the relation between the Fe composition of CoFe and the resistance change of the ferromagnetic film B, spin valve films (d) in which the Fe composition was changed in the ferromagnetic film B were prepared and examined. Consequently, it has been found that the resistance change lowers abruptly when the Fe composition exceeds 20 at %. FIG. 15 shows the results.

Spin valve film (d):
  Glass substrate;
  Underlayer: NiFeCr 42 Å/Ru 4.5 Å/NiFe 5 Å;
  Free layer: NiFe 5 Å/CoFe 15 Å;
  Non-magnetic spacer film: Cu 19 Å;
  Ferromagnetic film B: Co—X % Fe 25 Å;
  Anti-ferromagnetic coupling film: Ru 3.5 Å;
  Ferromagnetic film A: Co-50% Fe 24 Å; and
  Cap: Ta 20 Å.

It is possible that the reason for the results shown in FIG. 15 is that crystals of the ferromagnetic film B are in a face-centered cubic structure when the Fe composition is 20 at % or less, whereas the crystals are in a mixed state with body-centered cubic structure when the Fe composition exceeds 20 at %, which lowers the matching property with the adjacent conductive layer (Cu) of the face-centered cubic structure. Accordingly, it is preferred that the Fe composition in the ferromagnetic film B is within a range of 20 at % or less (0 at % or more). Further, as can be seen from FIG. 1, in a case where the Fe composition is 20 at % or less, since the coercivity of the ferromagnetic film B is 20 Oe or less and is sufficiently smaller compared with the coercivity of the ferromagnetic film A (200 Oe or more) of Co 50 at % Fe composition, it has an advantage capable of controlling the direction of the magnetization of the pinned layer 80 as will be described later.

The stacked pinned layer 80 is comprised of a ferromagnetic film A and a ferromagnetic film B, with an anti-ferromagnetic coupling film in between. The anti-ferromagnetic coupling film has a function of coupling the ferromagnetic film A and the ferromagnetic film B in an anti-parallel manner. One of parameters expressing the strength of interaction coupling the ferromagnetic film A and the ferromagnetic film B in the anti-parallel manner is an anti-ferromagnetic coupling saturation magnetic field (hereinafter referred to as Hs). This is a level of a magnetic field necessary for causing the magnetization of the ferromagnetic film A and the ferromagnetic film B that are directed anti-parallel to each other in the stacked pinned layer 80 to magnetically saturate in the parallel direction by the external magnetic field (in other words, to be brought into a completely parallel state).

The anti-ferromagnetic coupling saturation magnetic field Hs has an effect on the durability of the stacked pinned layer 80 to the external magnetic field, and as the value is increased, the durability to the external magnetic field is qualitatively improved. To investigate the relation between the saturation magnetic field Hs and the thickness of the anti-ferromagnetic coupling film (Ru), a spin valve film having a pinned layer with a greater thickness compared to the practical pinned layer was prepared with the thickness of Ru film being varied between 3.5 Å and 5.0 Å. The anti-ferromagnetic coupling saturation magnetic field Hs was then measured at various temperatures.

This spin valve film comprises the following:
  glass substrate/CL;
  underlayer: NiFeCr 42 Å/Ru 4.5 Å/NiFe 5 Å;
  free layer: NiFe 20 Å/CoFe 10 Å;
  non-magnetic spacer film: Cu 25 Å;
  ferromagnetic film B: Co—Fe 180 Å;
  anti-ferromagnetic coupling film: Ru X Å;
  ferromagnetic film A: Co Fe 180 Å; and
  cap: Ta 20 Å.

In this case, the film thickness of CoFe of each of the ferromagnetic film A and the ferromagnetic film B is increased to 180 Å which is about 8 times as large as the practical level. This is because the maximum magnetic field of the measuring instrument is 5000 Oe and it is intended that Hs can be measured within the range of the magnetic field.

Figure 3A:
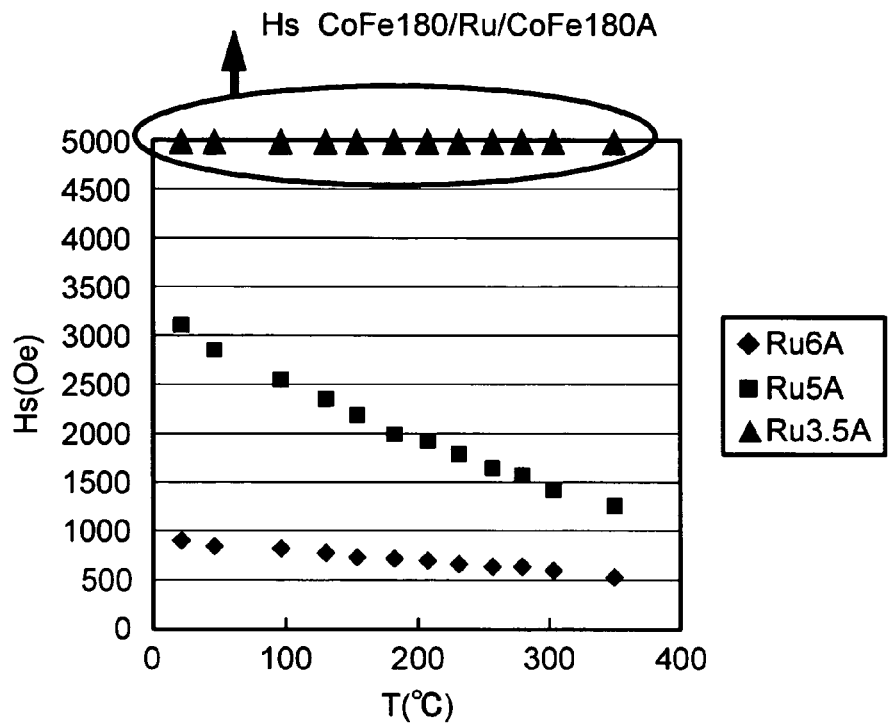
FIG. 3(a) is a graph where the CoFe film thickness is 180 Å and FIG. 3(b) is a graph where the CoFe film thickness is converted to 25 Å.
Figure 3B:
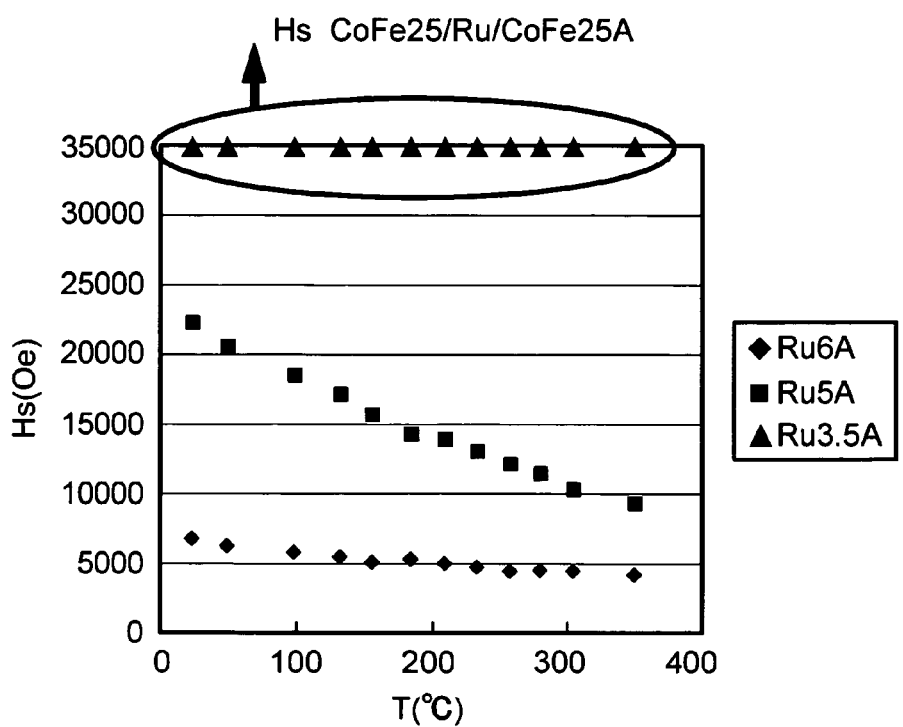

FIG. 3(a) shows the result. The value Hs at room temperature increases from 900 Oe to 3100 Oe and further to 5000 Oe or higher as the thickness of the Ru film decreases from 6 Å to 5 Å and, further to 3.5 Å. At the thickness of the Ru film of 3.5 Å, Hs exceeds 5000 Oe as the upper measuring limit for the magnetic field, which is expressed as 5000 Oe or more. Since Hs and the thickness of each of the ferromagnetic films A and B are in an inverse proportional relation (on the premise that the thickness is equal between the ferromagnetic film A and the ferromagnetic film B), the result of converting the film thickness of CoFe to 25 Å is shown in FIG. 3(b). As a result, the value Hs at a room temperature (about 20° C.) is 7000 Oe for Ru 6 Å and 22000 Oe for Ru 5.0 Å, and it reaches a extremely large value of 35,000 Oe or more at Ru 3.5 Å. Accordingly, when the thickness of the Ru film is about 3.5 Å, durability to the external magnetic field is improved. Further, Hs changes linearly relative to the temperature elevation and Hs at 300° C. relative to Hs at room temperature is 60% for Ru A and 45% for Ru A.

To then examine the relation between "thickness of Ru film" and "resistance change property of the spin valve film", a spin valve film using a ferromagnetic film A of Co 50 at % Fe and a ferromagnetic film B of Co 10 at % Fe was prepared. During film deposition of the stacked pinned layer, a constant magnetic field is applied.

Glass substrate/CL;
Underlayer: NiFeCr 42 Å/Ru 4.5 Å;
Free layer: NiFe 20 Å/CoFe 10 Å;
Non-magnetic spacer film: Cu 20 Å;
Ferromagnetic film B: Co 10 at % Fe 25 Å;
Anti-ferromagnetic coupling film: Ru X Å (X=2.5–50);
Ferromagnetic film A: Co 50% Fe Y Å (Y=23, 24, 25); and
Cap: Ta 20 Å.

Figure 4:
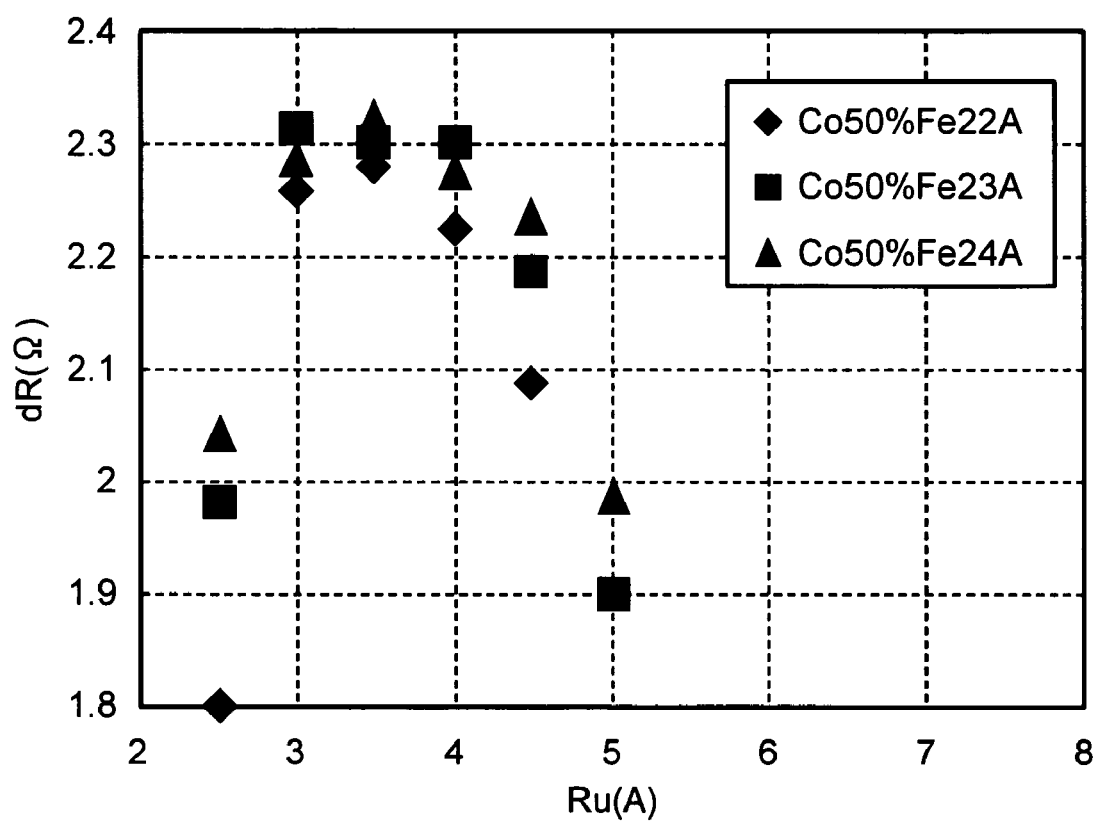
FIG. 4 is a graph showing the dependence of the resistance change of a spin valve film using Co 50 at % Fe for the ferromagnetic film A and using Co 10 at % Fe for the ferromagnetic film B on the thickness of an Ru film.

FIG. 4 shows the relation between the resistance change property and the thickness of the Ru film obtained from the above examination. When the thickness of the Ru film increases from 2.5 to 3.0 Å, the resistance change increases from 2.0 to 2.3 Ω/□ and then settles constant from 3.0 to 4.0 Å. The resistance change decreases from 2.3 Ω/□ to 2.0 Ω/□ as the thickness of Ru increases from 4.0 to 5.0 Å. The resistance change of the spin valves takes a peak as described above because Hs has a sufficiently large value in this range, and it is preferred to select the range of 3.0 to 4.0 Å for the thickness of the Ru film where the resistance change reaches a peak.

The desired structure has been described from the viewpoint of stability of the external magnetic field along with increasing the resistance change. The important feature of this embodiment is to re-arrange the magnetization into a desired direction by performing appropriate magnetic field application at room temperature in a case where the direction of the magnetization of the pinned layer 80 is deviated from the desired direction, for example, in the step of air bearing surface fabrication, that is, to provide a constitution capable of controlling the direction of magnetization of the pinned layer at room temperature. The constitution capable of restoring the magnetization of the pinned layer into a desired direction and its restoring method are to be described below.

At first, various studies have been made to control the magnetization direction of the pinned layer in a constitution using Co 50 at % for both the ferromagnetic film A and ferromagnetic film B, that is, in a constitution where both the ferromagnetic films A and B have the same coercivity (about 300 Oe). However, there was no success in controlling the magnetization of the pinned layer in the intended direction within the range of these studies.

However, there has been success in controlling the magnetization direction of the pinned layer to an intended direction using a constitution of Co 50 at % Fe for the ferromagnetic film A and Co 10 at % Fe for the ferromagnetic film B, that is, where the coercivity of the ferromagnetic film (about 300 Oe) is increased 30 times as large as the coercivity of the ferromagnetic film B (about 10 Oe). The constitution and the method are to be described below.

Figure 5:
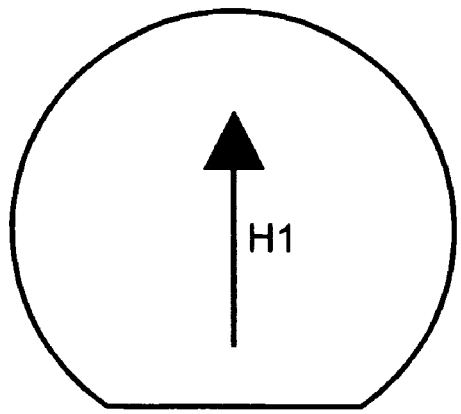
FIG. 5 is a view showing the method of magnetic field application for controlling the magnetization of the pinned layer into an intended direction (two-step magnetic field treatment).
Figure 5:
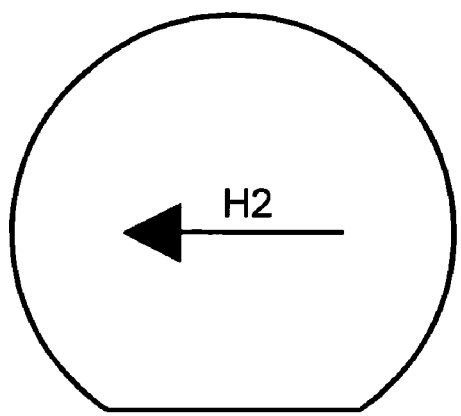

A two-step magnetic field application method is used to apply the magnetic field. FIG. 5 shows the method of magnetic field application. In the first step, a uni-directional magnetic field at a level H1 is applied in the desired direction to which the magnetization of the ferromagnetic film A is intended. After removing the magnetic field, a uni-directional magnetic field at a level H2 is applied in a direction perpendicular to the direction of the first step and then the magnetic field is removed. To determine the spin valve film constitution that can be controlled by the magnetic field application method and an appropriate level of magnetic fields (H1 and H2), the thickness of a spin valve film in which the thickness of the anti-ferromagnetic coupling film (Ru) is changed between 3.0 to 4.0 Å and the thickness of the ferromagnetic film A is changed between 22.0 to 26.0 Å is prepared using the constitution described below. During film deposition of the pinned layer of the spin valve film, a constant magnetic field (70 Oe) is applied to deposit the film for the pinned layer.

Glass substrate/CL;
Underlayer: NiFeCr 42 Å/Ru 4.5 Å;
Free layer: NiFe 5 Å/CoFe 15 Å;
Non-magnetic spacer film: Cu 19 Å;
Ferromagnetic film B: Co 10 at % Fe 25 Å;
Anti-ferromagnetic coupling film: Ru X Å (X=3.0–4.5);
Ferromagnetic film A: Co 50% Fe Y Å (Y=22.0–26.0); and
Cap: Ru 5 Å/Ta 20 Å.

After forming the spin valve film described above, the magnetic field application method described above was performed and then, the magnetization controllability property of the pinned layer was examined. After film deposition, transfer curves were measured and the resistance change (the resistance change value is hereinafter referred to as dR1) and the direction of the magnetization of the ferromagnetic film A (hereinafter, the magnetization direction of the ferromagnetic film A is referred to as Alpha1) were determined. As a result, it was confirmed that the ferromagnetic film A was directed to the direction of the magnetic field applied during deposition (hereinafter the direction is referred to as 0 degree. Accordingly, Alpha1 was substantially at 0 degree), while the ferromagnetic film B was directed to a direction opposite to the application direction during deposition. To investigate the controllability for the magnetization of the pinned layer by the magnetic field application, magnetization reversal of the pinned layer was attempted.

Figure 16:
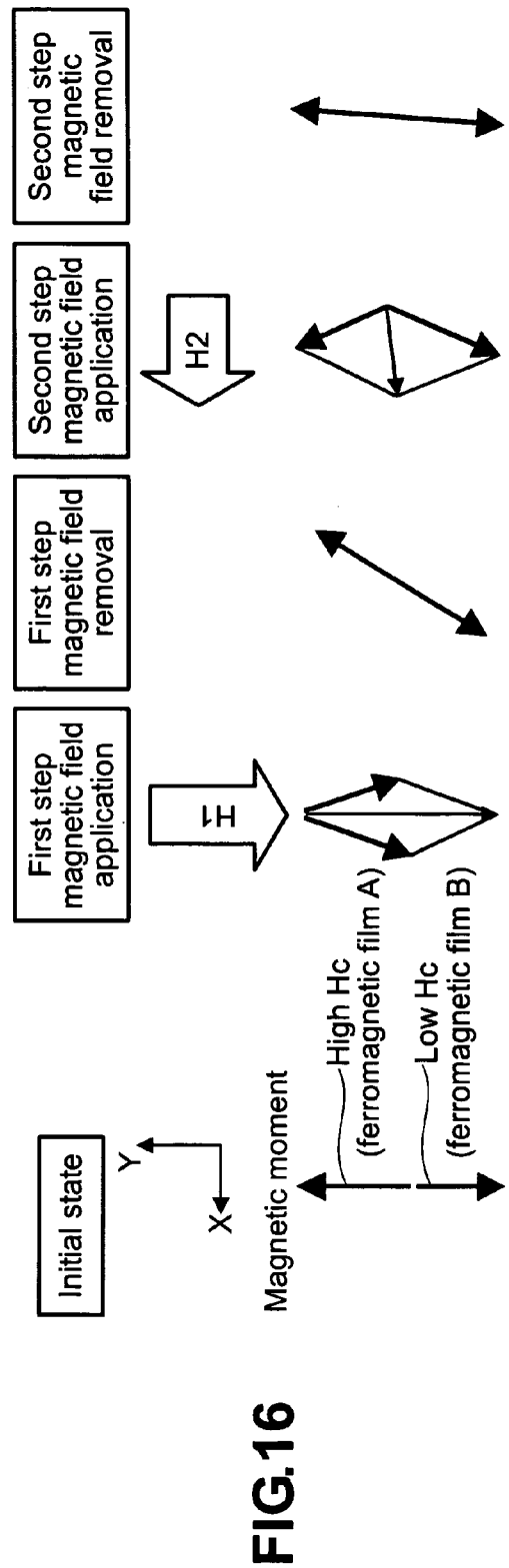
FIG. 16 is a diagram showing the principle of reversal control for the magnetic moment of the stacked pinned layer of in this embodiment.

FIG. 16 shows by way of example a principle of controlling the magnetic moment of the ferromagnetic film A which is directed in +Y direction in the initial state into −Y direction by a two-step magnetic field application. The essential conditions for controlling the direction of the magnetic moment is that the coercivity of the ferromagnetic film A is larger than that of the ferromagnetic film, and that the magnetic moment of the ferromagnetic film A is larger than that of the ferromagnetic film B.

In the magnetic resistive head having the spin valve film as an element, a phenomenon may occur wherein the magnetic moment of the pinned layer is reversed due to the air bearing surface lapping fabrication (magnetic structural damage). FIG. 16 shows the reversed state as an initial state. In the initial state, the magnetic moment of the ferromagnetic film A (high Hc) is magnetized in +Y direction, and the magnetic moment of the ferromagnetic film B (low Hc) is magnetized in −Y direction.

Initially, the magnetic field of the first step is applied in a direction intended to control the magnetic moment of the ferromagnetic film A, that is, in the −Y direction. Since the magnetic field at the first step is higher, it is preferred that the magnetic moment of the ferromagnetic film A upon application of magnetic field approaches the −Y direction.

In the course of removing the magnetic field at the first step, the change of direction of the magnetic moment of the ferromagnetic film A having large coercivity is relatively small and the magnetic moment of the ferromagnetic film B having smaller coercivity changes mainly to form an antiparallel state, so that the magnetic moment of the ferromagnetic film A approaches the −Y direction. However, the magnetic moment of the ferromagnetic film A does not reach the state parallel to the −Y direction. This is because the magnetic moment as the synthesis of the ferromagnetic film A and the ferromagnetic film B in the course of removing the magnetic field approaches the direction of the magnetic field to decrease the Zeeman energy.

Then, to allow the magnetic moment of the ferromagnetic film A that approached −Y direction to approach substantially the −Y direction, a second step magnetic application is conducted in the direction perpendicular to the first step magnetic field (direction X). It is preferred that the second step magnetic field is made smaller compared with the first step magnetic field. If the magnetic field is too strong, the magnetic moment of the ferromagnetic film A that approached −Y direction by the first step magnetic field application approaches the X direction. The second step magnetic field application also serves as a treatment for determining the direction of the magnetic moment of the permanent magnet films disposed on both sides of the GMR layer. Accordingly, it is necessary to make it larger than the coercivity Hc of the permanent magneto layer (permanent magneto layer).

In the course of decreasing the magnetic field at the second step, the magnetic moment of the ferromagnetic film A is directed substantially to the −Y direction by utilizing the fact that the moment of the synthesis of the ferromagnetic films is directed to the magnetic field direction to lower the Zeeman energy. Accordingly, a large difference in the magnetic moments between the ferromagnetic film A and ferromagnetic film B is not desired. The allowable extent of the difference is to be described later.

In the two-step magnetic field application method, the magnitude for H1 is set to two types of levels at 10,000 Oe and 14,000 Oe. The magnitude for H2 was set to 10,000 Oe. After the two-step magnetic field application, transfer curves were measured and the resistance change and the direction of magnetization of the ferromagnetic film A were examined. The value of the resistance change is dR2 and the direction value of the ferromagnetic film A is Alpha2 after the application. In this embodiment, Alpha2 is within a range of 180±10 degrees, and it is judged that 180° reversion is succeeded for the magnetization of the ferromagnetic film A when the value of resistance change dR2 is 95% or more for dR1, and the magnetization direction of the pinned layer can be controlled.

In FIGS. 6(a) and 6(b), symbols "O" are attached to the constitution where the magnetization reversal of the pinned layer succeeded according to the judging criterion, while symbols "X" are attached to the constitution where the magnetization reversal did not satisfy the judging criterion. Accordingly, constitution attached with symbols "0" means constitutions capable of controlling the magnetization of the pinned layer.

FIG. 6(a) shows a result in which H1 was performed at 10,000 Oe and FIG. 6(b) shows the result where H1 was performed at 14,000 Oe. In this constitution, Ru 5 Å/Ta 20 is used for the cap layer and the magnetic moment becomes equal between the ferromagnetic film A and the ferromagnetic film B when the thickness of the ferromagnetic film A is 22.0 Å. In a case where the thickness of the ferromagnetic film A is 22.0 Å, that is, in a case where there is no difference of the magnetic moments between the ferromagnetic film A and the ferromagnetic film B, the magnetization cannot be controlled favorably irrespective of the magnitude of H1 whether it is 10,000 Oe or 14,000 Oe, or irrespective of the thickness of the Ru film. At the thickness of the ferromagnetic film A of 22.5 Å, the magnetization reversal is failed irrespective of the thickness of the Ru film in a case where H1 is 10,000 Oe, whereas control succeeds where H1 is increased to 14,000 Oe at the thickness of the ferromagnetic film A of 22.5 Å and within the range of the thickness of the Ru film from 3.0 Å to 4.5 Å.

Further, in a case where the thickness of the ferromagnetic film A is increased to 23.0 to 23.5 Å, magnetization control does not succeed at the Ru thickness of less than 4.0 Å where H1 is 10,000 Oe, whereas the magnetization control succeeds at any thickness of the Ru film at H1 of 14,000 Oe. At H1 of 10,000 Oe, magnetization reversal succeeds at any thickness of the Ru film within a range of 3.0 Å to 4.0 Å at the film thickness of the ferromagnetic film A within a range from 24.5 Å to 25.0 Å. Further, at H1 of 14,000 Oe, magnetization reversal succeeds at any thickness of the Ru film within a range of 3.0 Å to 4.0 Å when the thickness of the ferromagnetic film A is within a range from 22.5 Å to 25.0 Å.

Control does not succeed at any thickness of the Ru film where the thickness of the ferromagnetic film A is further increased to a range of 25.5 Å or more. This is attributable to the excessive thickness of the ferromagnetic film A, since the magnetic moment of the pinned layer expressed by the difference moment between ferromagnetic film A and ferromagnetic film B is increased and the fixed magnetic moment inclines to the direction of the application magnetic field at the second stage due to the second step application magnetic field.

The foregoing results are summarized as the following (1) to (4):

(1) The magnetization reversal of the pinned layer is possible for a thinner Ru thickness and at a smaller difference in magnetic moment between the ferromagnetic film A and the ferromagnetic film B as H1 is higher.

(2) The magnetization reversal of the pinned layer is possible for larger Ru film thickness at an identical level H1.

(3) The magnetization for the pinned layer cannot be reversed satisfactorily in a case where the total magnetic moment of the pinned layer (difference in magnetic moment between the ferromagnetic film A and the ferromagnetic film B) is excessively small.

(4) The magnetization of the pinned layer cannot be satisfactorily reversed where the total magnetic moment of the pinned layer (difference in magnetic moment between the ferromagnetic film A and the ferromagnetic film B) is excessively large since the magnetization inclines to the direction of the second step application magnetization by the second step magnetic field application.

Items (1) and (2) are the same phenomenon expressed from different viewpoints; the lower limit value for the first step application magnetic field H1 is determined by the saturation magnetic field Hs for anti-ferromagnetic coupling, and the lower limit value for H1 increases as Ru is thinner and Hs is higher, whereas the lower limit value for H1 increases as the Ru thicker and Hs is lower. Accordingly, for the same H1, magnetization reversal of the pinned layer is more likely to occur at thicker Ru since Hs is decreased. Further, referring to item (3), in the case where the magnetic moment of the ferromagnetic film A with large coercivity is larger than that of the ferromagnetic film B with smaller coercivity, the magnetization direction of the ferromagnetic film A with larger coercivity and larger moment has less change and the magnetic moment of the ferromagnetic film A is in a direction approaching the application magnetic field direction after the application of the first step magnetic field.

Whereas the magnetic moment of the ferromagnetic film B with smaller coercivity and smaller moment mainly changes into the anti-parallel state in the course of removing the magnetic field after the application of the first step magnetic field. Further, in a case where the difference of coercivity between the ferromagnetic film A and the ferromagnetic film B increases, since the change of direction of the magnetic moment of the ferromagnetic film A decreases in the course of removing the magnetic field after the application of the first step magnetic field, magnetization reversal is successful even when the difference of the magnetic moment between the ferromagnetic film A and the ferromagnetic film B (total magnetic moment of the pinned layer) is small. Item (4) occurs since the magnetic moment of the ferromagnetic film A tends to be in the direction of applying the second step magnetic field unless the total moment of the pinned layer is restricted to a certain value.

The foregoing can be described mathematically as below. DA is a thickness for the ferromagnetic film A, DA0 is a thickness of the ferromagnetic film A when the magnetic moment of the ferromagnetic film B and the magnetic moment of the ferromagnetic film A are equal and C, $\Delta 1$ and $\Delta 2$ are constants.

$$H1 \geq C \cdot Hs \quad \text{(formula 1)}$$

$$\Delta 1 \leq (DA-DA0)/DA0 \leq \Delta 2 \quad \text{(formula 2)}$$

$$\Delta 1 = \Delta 1(HcA) \quad \text{(formula 3)}$$

Accordingly, in only considering the controllability for the magnetization of the pinned layer, in view of formula 1, it may be preferred to decrease Hs by increasing the thickness of Ru so as to make it easier to satisfy formula 1 and increase to some extent the total magnetic moment of the pinned layer to an appropriate value by increasing the thickness of the ferromagnetic film A in a proper range to satisfy formula 2. However, since the durability of the pinned layer to the external magnetic field is lowered as the total magnetic moment of the pinned layer is larger, it is desirable, to avoid this, to increase Hs by making the value for Ru as close as 3.5 Å, and making the thickness of the ferromagnetic film A identical with a value to reduce the difference of magnetic moment to zero between the ferromagnetic film B and ferromagnetic film A as much as possible (22.0 Å in a case of FIG. 6). For this purpose, it is necessary to increase the application magnetic field H1 at the first step as high as possible and decrease $\Delta 1$ as small as possible. To increase H1, it is only needed to prepare a magnetic field application facility capable of applying large magnetic field. Further, to make $\Delta 1$ smaller, it is desirable to increase the coercivity Hc A of the ferromagnetic film A as much as possible to make the difference relative to the coercivity HcB of the ferromagnetic film B as large as possible.

Then, In view of the result of the saturation magnetic field (Hs) of anti-ferromagnetic coupling shown in FIG. 3(b) and formula 1, it has been found that a desired result can be obtained at least based on:

$$C=0.4=(H1:14,000/Hs:35,000)$$

Further, in this embodiment, it is calculated in view of the result shown in FIG. 6(b) and formula 2 as:

$$\Delta 1 = 0.0227 (\approx (22.5-22.0)/22.0)$$

$$\Delta 2 = 0.136 (\approx (25.0-22.0)/22.0)$$

Further, if:

$$HcA \leq 200 \text{ Oe} \quad \text{(formula 4)}$$

then, $\Delta 1$ can be decreased to 2.3% or less as:

$$\Delta 1 \leq 0.0227 \quad \text{(formula 5)}$$

Figure 7:
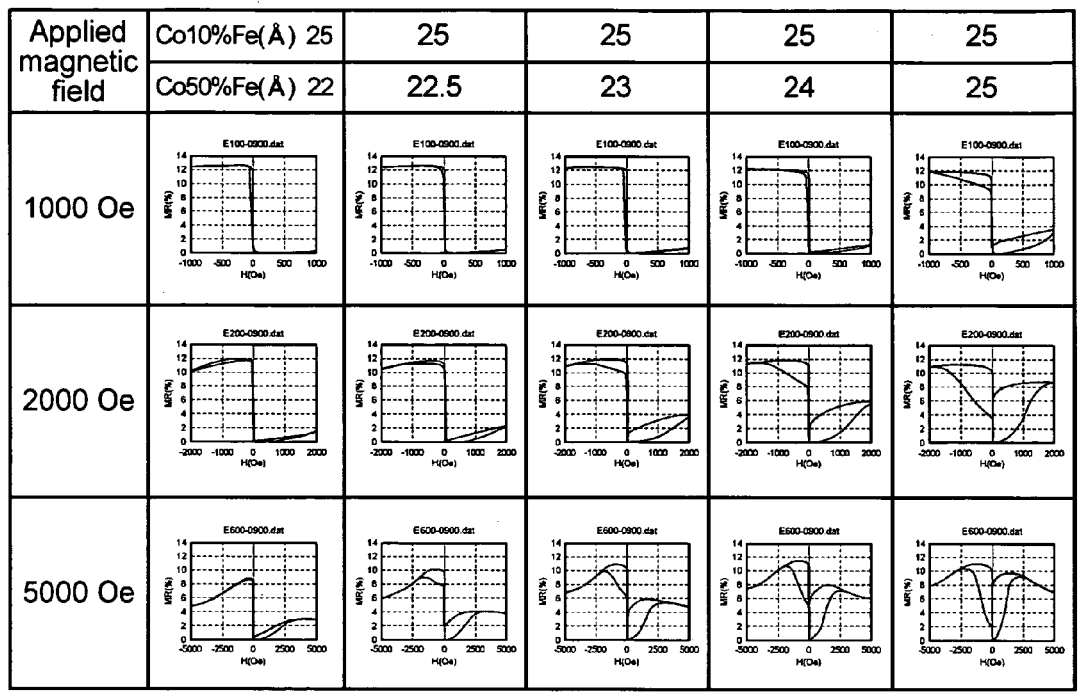
FIG. 7 is a diagram showing transfer curves at a measuring magnetic field of 1,000 Oe, 2,000 Oe, and 5,000 Oe, in a case of changing the thickness of the ferromagnetic film A (Co 10 at % Fe) while setting the thickness of the ferromagnetic film B (Co 10 at % Fe) to a constant level.

Referring to the previous example, the magnetization of the pinned layer can also possibly be reversed by setting the thickness of the ferromagnetic film A to 22.5 Å relative to the thickness of the ferromagnetic film A of 22.0 Å at which the magnetic moment in the pinned layer is reduced to 0. FIG. 7 shows transfer curves when the thickness of the ferromagnetic film A is changed. It can be seen that no hysteresis is observed for the waveform in the constitution in which the ferromagnetic film thickness A is 22.5 Å and which satisfies necessary condition as a pinned layer having high stability to the magnetic field of at least 1000 Oe in the magnetization direction of the pinned layer.

Further, the second step magnetic field application (H2) is performed in order to allow the magnetic moment of the ferromagnetic film A directed to the vicinity of the application direction to approach the direction of the first step application magnetic field. As described above, since the magnetic moment is substantially equal between the ferromagnetic film A and the ferromagnetic film B (difference of about 10%), when the second step magnetic field is applied, for example, at about 10 kOe, the angle formed between the magnetic moments of the ferromagnetic films A and B decreases to less than 180° from the anti-parallel state and the synthesis moment rotates in the direction of the applied magnetic field. When the applied magnetic field is removed from the state, the magnetic moments of the ferromagnetic films A and B are arranged anti-parallel with each other in the direction substantially perpendicular to the applied magnetic field. What is important in this process is that there is no large difference in the magnetic moments between the ferromagnetic film A and ferromagnetic film B and that the magnetic moments of the ferromagnetic films A and B are do not extremely deviate from the direction perpendicular to the magnetic field by excessively increasing the applied magnetic field (H2). This is because both of the moments are not brought into a state perpendicular to the applied magnetic field after removing the magnetic field if the difference between the magnetic moments is large. Further, this is because the ferromagnetic film A deviates greatly from the direction perpendicular to the applied magnetic field during applications and cannot return to the direction perpendicular to the applied magnetization even after removing the magnetic field because of large coercivity of A when the applied magnetic field is increased excessively. It is desirable that the upper limit of H2 is 35% or less of Hs.

Further, another function of the second step magnetic field application is for the magnetizing treatment of permanent magnet films adjacent to the magnetoresistive sensor film (treatment of directing the magnetic moment to the direction of the magnetic field application). Accordingly, it is necessary that H2 is larger than at least the coercivity Hc of the permanent magnet. Therefor, H2 has to be in the following range:

$$Hc \leq H2 \leq 0.35 Hs \qquad \text{(formula 6)}$$

Embodiment 2

Figure 8:
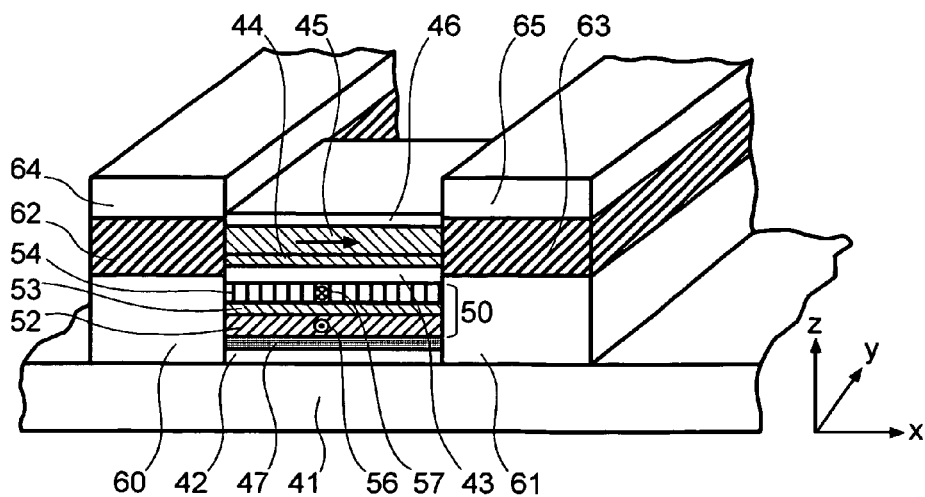
FIG. 8 is a view showing a structure of a spin valve type magnetoresistive sensor using a stacked type pinned layer.

FIG. 8 shows a concrete constitution of a read sensor according to another embodiment of the present invention. A description is to be made with reference to the constitution of FIG. 8 and the details thereof will be described later. A spin valve film 18 has a first ferromagnetic film which tends to respond relatively easily to the magnetic field (hereinafter referred to as a free layer, which corresponds to, for example, CoFe film 44 and a permalloy film 45), a second ferromagnetic film which tends to respond relatively less to the magnetic field (hereinafter referred to as the pinned layer, which corresponds to the stacked pinned layer 50) and a conductive non-magnetic spacer film therebetween (for example, corresponding to s Cu film 43). Further it has an underlayer 42 below the pinned layer for controlling the crystal form to increase the resistance change. Further, it has a cap layer (for example, corresponding to a Ta cap 46) above the free layer constituted of the CoFe film 44 and the permalloy film 45.

In this embodiment, the stacked pinned layer 50 using, for example, two ferromagnetic films (for example, corresponding to a ferromagnetic film A (52) and ferromagnetic film B (54)) and anti-ferromagnetic coupling film (for example, corresponding to the Ru film 53) between the ferromagnetic films (52 and 54) as the pinned layer 50 gives a constitution that functions as a spin valve type writing head for use in the magnetic recording apparatus. This constitution is similar to that of Embodiment 1 in that it has no exchange coupling film adjacent to the pinned layer 50. It is different from the other embodiment in that the pinned layer 50 situates below in view of the direction of the axis Z (that is, the pinned layer 50 is stacked below the free layer (bottom spin valve type magnetic head) and in that it has a buffer layer 47 for the underlayer 42.

The value of the coercivity of the ferromagnetic film A or B forming the pinned layer varies greatly depending on the type of the adjacent underlayer. To investigate the optimal underlayer, the dependence of the coercivity of the ferromagnetic film CoFe on the Fe composition was examined while varying the constitution of the underlayer. For the constitution of the underlayer 42, (NiFeCr 42 Å/Ru 4.5 Å/buffer layer (47)) was used.

For the buffer layer 47, the following four types were examined:

(1) Nothing at all (with no buffer layer)
(2) NiFe 5 Å
(3) Cu 10 Å
(4) NiFe 5 Å/Cu 10 Å

The constitution of the spin valve film in this embodiment is as shown below. In this case, to examine the relation between the coercivity of a bottom type pinned layer and a buffer layer, a film to be a pinned layer is used as the free layer as shown in the following constitution. Constitution of an actual bottom spin valve type magnetic head is to be described later.

Glass substrate/CL;
Underlayer: NiFeCr 42 Å/Ru 4.5 Å/buffer layer;
Free layer: Co—X at % Fe 20 Å;
Non-magnetic spacer film: Cu 19.5 Å;
Pinned layer: [Co 10% Fe 25/Ru 3.5 Å/Co 50% Fe 23.5 Å]; and
Cap: Ta 20 Å.

Figure 10:
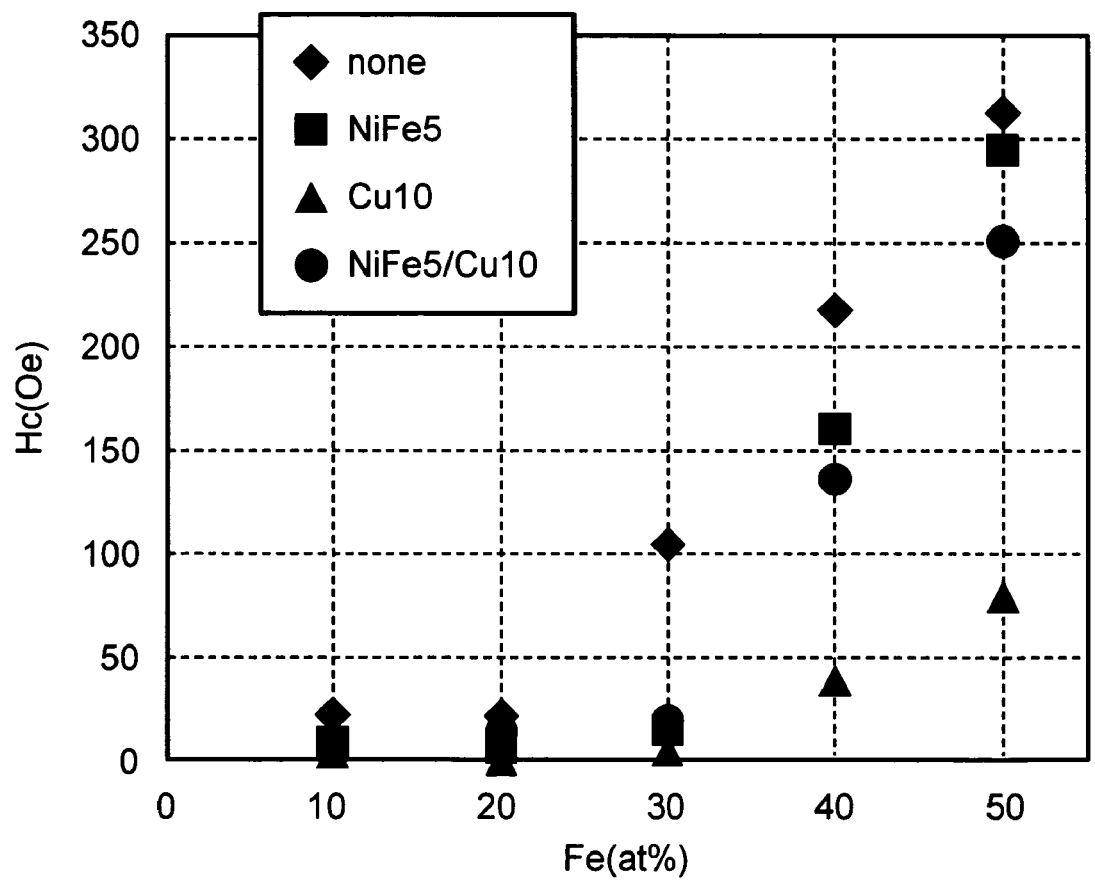
FIG. 10 is a diagram illustrating the dependence of the coercivity on the Fe composition of the ferromagnetic film A of the bottom type spin valve sensor film shown in FIG. 8 when using various underlayers.

In this constitution, [Co 10% Fe 25/Ru 3.5 Å/Co 50% Fe 23.5 Å] is a pinned layer and Co—X at % Fe 20 Å is a free layer, and the coercivity of the Co—X at % Fe layer as the free layer on the underlayer 42 was investigated. The result is shown in FIG. 10. The coercivity increases along with increase of the Fe composition when any of the buffer layers is used. Then, the coercivity Hc increases outstandingly from Fe 40 at % and, for example, at Fe 50 at %, the coercivity is 250 to 300 Oe in the cases where the buffer layer is not present, where the buffer layer is NiFe 5 Å and where the buffer layer is NiFe 5 Å/Cu 10 Å, and it functions as the ferromagnetic film A constituting the pinned layer. However, in the case where the buffer layer is not present, there is a problem that the MR ratio is low. Considering this, a constitution is preferable in which the buffer layer is disposed on the underlayer (NiFeCr/Ru), and use of the buffer layer of NiFe is optimal in this embodiment. Further, in a case where Cu 10 Å is used for the buffer layer, the coercivity of Co 50 at % Fe is about 100 Oe and it has been found that this does not function well as the ferromagnetic film A constituting the pinned layer.

Figure 11:
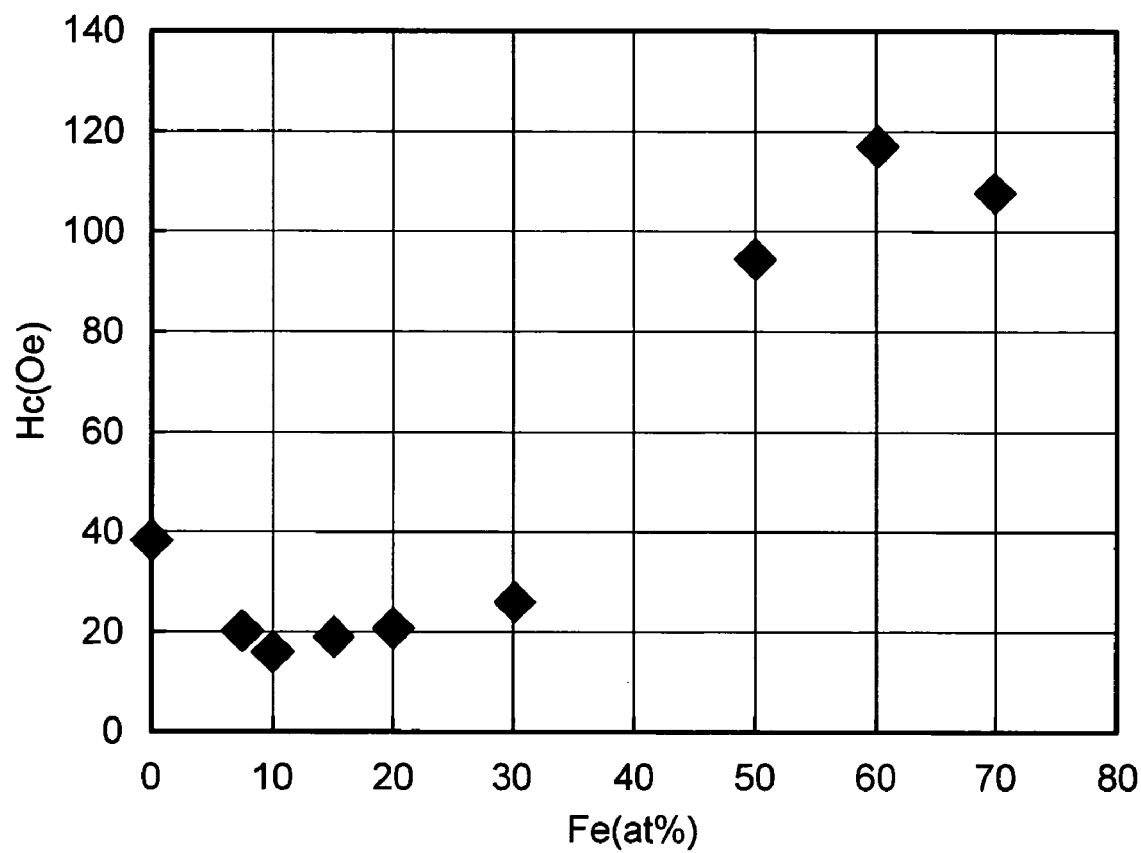
FIG. 11 is a diagram showing the dependence of the coercivity on the Fe composition of the ferromagnetic film A of the bottom type spin valve sensor film shown in FIG. 8 in a case of using underlayers different from those used in FIG. 10.

FIG. 11 shows a result of examining the dependence of the coercivity CoX at % Fe layer on the Fe composition in a case of using NiFeCr/NiFe/PtMn for the underlayer 42. The constitution of the spin valve film is as described below:

Glass substrate/CL;
Underlayer: NiFeCr 32 Å/NiFe 8 Å/PtMn 30 Å;
Free layer: CoX at % Fe;
Non-magnetic spacer film: Cu 19.5 Å;
Pinned layer: [Co 10% Fe 25/Ru 3.5 Å/Co 50% Fe 23.5 Å]; and
Cap: Ta 20 Å.

In FIG. 11, coercivity is minimum at 10 to 20 at % Fe and the coercivity is maximum at 60 at % Fe composition. However, the maximum value is 120 Oe, which is excessively small as the ferromagnetic film A constituting the pinned layer. Then, the Fe composition was fixed at 60 at % and studied as the buffer layer between PtMn and Co 60 at % Fe. Ru, Cu, Al, and NiFeCr were used as the material for the buffer layer and they were examined while changing the film thickness. The constitution of the spin valve film is as shown below:

Glass substrate/CL;
Underlayer: NiFeCr 32 Å/NiFe 8 Å/PtMn 30 Å/buffer layer (=Ru, Cu, Al, NiFeCr);
Free layer: Co 60 at % Fe 20 Å;
Non-magnetic spacer film: Cu 19.5 Å;
Pinned layer: Co 10 at % Fe 25/Ru 3.5 Å/Co 60 at % Fe 23.5 Å; and
Cap: Ta 20 Å.

Figure 12:
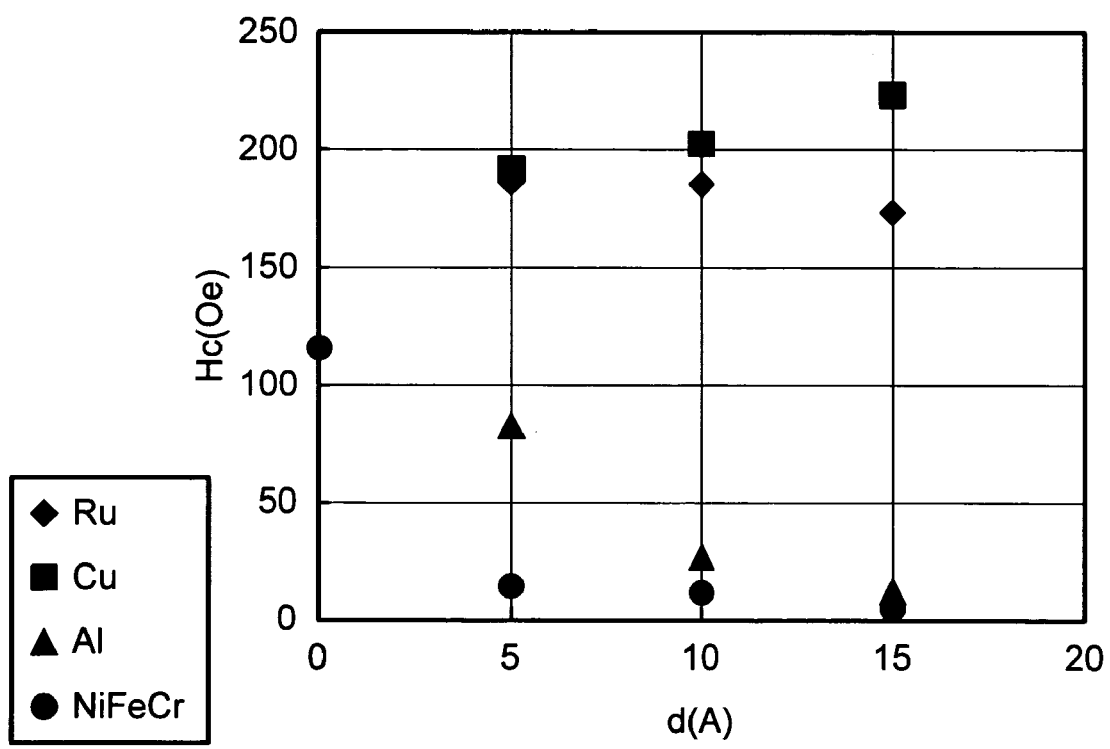
FIG. 12 is a diagram showing the dependence of the coercivity on the Fe composition of the ferromagnetic film A, of the bottom type spin valve sensor film shown in FIG. 8 when using underlayers different from those used in FIG. 11.

In the spin valve film described above, the thickness of the buffer layer was changed from 0 to 15 Å. FIG. 12 shows the result. When using Ru or Cu for the buffer layer, the coercivity of the Co 60 at % Fe layer was increased up to 200 Oe. It was also found that 5 Å or more thickness may suffice for the buffer layer. Further, in a case of using Al or NiFeCr for the buffer layer, it was found that since the coercivity of the Co 60 at % Fe layer thereon was decreased, Al or NiFeCr is not suitable as the buffer layer.

In view of the foregoing, an example of an element constitution for a bottom spin valve type magnetic head in this embodiment is shown below:
- Glass substrate/CL;
- Underlayer: NiFeCr 42 Å/Ru 4.5 Å/NiFe 5 Å (buffer layer);
- Pinned layer: Co 50% Fe XÅ/Ru 3.5 Å/Co 10% Fe 25 Å;
- Non-magnetic spacer film: Cu 19.5 Å;
- Free layer: CoFe 20 Å;
- Metal layer: Cu 8 Å;
- Insulative layer: Al 10 Å/Poxy (Poxy means plasma oxidation and, specifically, means a treatment of exposing aluminum in a mixed gas plasma of argon and oxygen and oxidizing aluminum); and
- Cap: Ta 20 Å.

Figure 21:
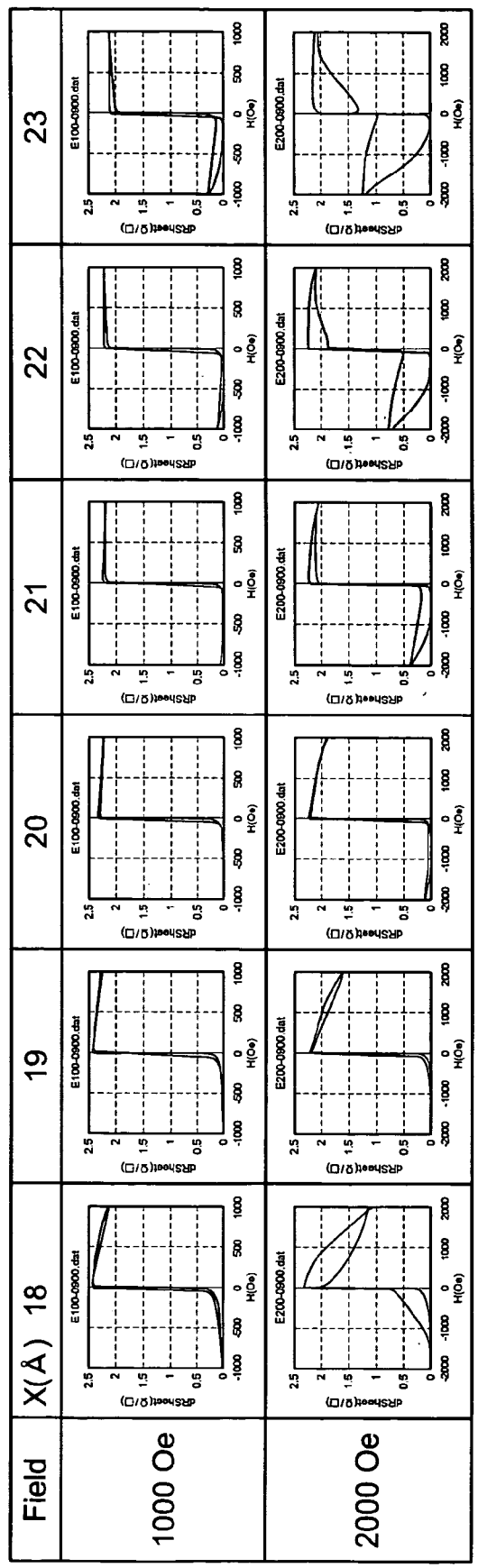
FIG. 21 is a graph showing transfer curves with changing thickness of the ferromagnetic film A in a bottom spin valve type magnetic head according to this embodiment.

FIG. 21 shows graphs of transfer curves when the thickness X of the ferromagnetic film A was set to from 18 to 28 Å and the external magnetic field was changed in a range of 1000 Oe or 2000 Oe for the constitution described above. At the thickness of Co 50% Fe layer of 19 Å, the difference in the magnetic moments between the ferromagnetic film A and the ferromagnetic film B is zero, no hysteresis is caused in a range of X from 19 to 22 Å at the measuring magnetic field of 1000 Oe and sufficient magnetic field endurance can be obtained. In a case where X is 20 to 22 Å, the magnetic moment of the pinned layer can be controlled by the two step magnetization method explained in Embodiment 1. Further, at the measuring magnetic field of the external magnetic field of 2000 Oe, no hysteresis is caused in a range of X near 20 Å, and sufficient magnetic field durability can be obtained. Then, in a case where X is in a range near 20 Å, the magnetic moment of the pinned layer can be controlled by the two-step magnetization method described in Embodiment 1 as well.

Embodiment 3

In Embodiments 1 and 2, the composition for CoFe is optimized in order to increase the coercivity of the ferromagnetic film, and there is another method of adding an additive element to Co or CoFe. Elements to be added include those such as Cr and V.

Embodiment 4

In Embodiments 1 to 3, descriptions have been made of preferred constitutions for the pinned layer constituting the spin valve type sensor films (top type, bottom type) but Embodiments 1 to 3 are applicable also to a magnetic head having a dual type spin valve sensor film.

Figure 17:
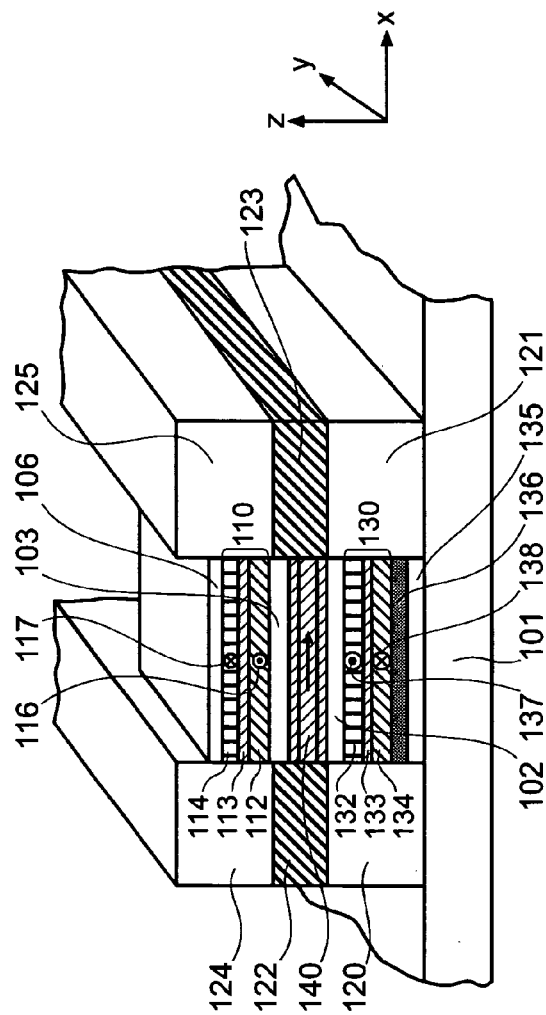
FIG. 17 is a view showing the constitution of a dual spin valve type magnetic head of this embodiment.

FIG. 17 shows a constitution of a magnetic head having a dual type spin valve sensor film. A first pinned layer 110 comprises a ferromagnetic film A (114) and a ferromagnetic film B (112) with an anti-ferromagnetic coupling film 113 being interposed between, and a second pinned layer 130 comprises a ferromagnetic film A (134) and a ferromagnetic film B (132) with an anti-ferromagnetic coupling film 133 being interposed therebetween. A free layer 140 is formed between the first pinned layer 110 and the second pinned layer 130 by way of non-magnetic spacers 102 and 103.

Reference numerals 116, 117, 137 and 138 denote directions of the magnetic moments of the respective ferromagnetic films of the first pinned layer 110 and the second pinned layer 130. The foregoing constitution of the spin valve film is formed by way of an underlayer 135 formed on the substrate 101, and a cap layer 106 is formed above the spin valve film. Further, the underlayer 135 may also be of a constitution having the buffer layer 136 shown in Embodiment 2. Permanent magnet underlayers 120, 121, permanent magnet films 122, 123 and electrodes 124 and 125 are formed on the right and left of the spin valve film.

In this embodiment, the following is formed as a GMR layer:
- Substrate;
- Underlayer: NiFeCr 42 Å/Ru 4.5 Å/NiFe 5 Å;
- Second pinned layer: Co 50% Fe 21 Å/Ru 3.5 Å/Co 10% Fe 25 Å;
- Non-magnetic spacer film: Cu 19.5 Å;
- Free layer: CoFe 5 Å/NiFe 15 Å/CoFe 5 Å;
- Non-magnetic spacer film: Cu 19.5 Å;
- First pinned layer: Co 10% Fe 25 Å/Ru 3.5 Å/Co 50% Fe 23 Å; and
- Cap: Ru 5/Ta 20 Å.

Also in the dual type spin valve film described above, magnetic properties of high stability for the external magnetic field (1000 Oe or more) can be obtained, and a magnetic head excellent in the controllability for the direction of the magnetic moment in the pinned layer can be attained, by defining the Fe composition of the ferromagnetic film A in a range from 40 at % to 80 at % and defining the Fe composition of the ferromagnetic film B in a range from 0 at % to 20 at % for the first pinned layer and the second pinned layer.

Figure 18:
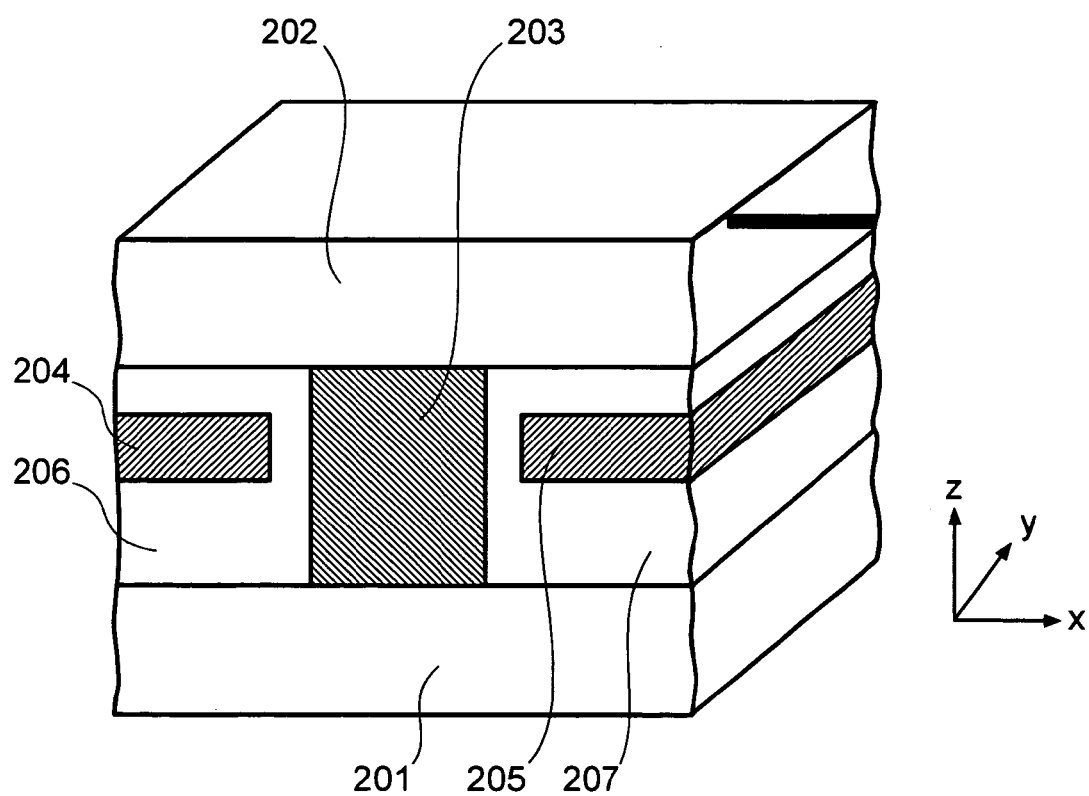
FIG. 18 is a view showing the constitution of a CPP-GMR head, and TMR head of this embodiment.

Further, Embodiments 1 to 3 can be used for a magnetic tunnel junction type sensor film having a pinned layer and a free layer in which a sense current flows in the direction perpendicular to the film surface, or CPP type sensor film having a pinned layer and a free layer in which a sense current flows in the direction perpendicular to the film surface. The schematic view of the sensor film is shown in FIG. 18.

Reference numeral 203 is a TMR film or CPP-GMR film and comprises electrode and magnetic shields 201, 202 supplying a sense current to the TMR film or CPP-GMR film, insulative layers 206, 207, and permanent magnet films 204, 205. Respective embodiments are shown below:

Constitution Example of CPP-GMR film:
- Lower shield/contact layer;
- Underlayer: NiFeCr 42 Å/Ru 4.5 Å/NiFe 5 Å;
- Second pinned layer: Co 50% Fe 21 Å/Ru 3.5 Å/Co 10% Fe 25 Å;
- Non-magnetic spacer film: Cu 19.5 Å;
- Free layer: CoFe 5 Å/NiFe 15 Å/CoFe 5 Å;
- Non-magnetic spacer film: Cu 19.5 Å;
- First pinned layer: Co 10% Fe 25 Å/Ru 3.5 Å/Co 50% Fe 23 Å;
- Cap: Ru 10 Å; and
- Contact layer/upper shield.

Constitution Example of TMR film:
- Lower shield/contact layer;
- Underlayer: NiFeCr 42 Å/Ru 4.5 Å/NiFe 5 Å;
- Second pinned layer: Co 50% Fe 21 Å/Ru 3.5 Å/Co 10% Fe 25 Å;
- Insulative layer: Al oxide layer 7 Å;
- Free layer: CoFe 5 Å/NiFe 15 Å
- Cap: Ru 20 Å; and
- Contact layer/upper shield.

Also in the CPP-GMR head and TMR head, a magnetic head capable of obtaining magnetic properties of high stability for the external magnetic field (1000 Oe or more) and excellent in the controllability in the direction of the magnetic moment in the pinned layer can be obtained by defining the Fe composition for the ferromagnetic film A in a range from 40 at % to 80 at % and the Fe composition for the ferromagnetic film A in a range from 0 at % to 20 at % in the first pinned layer and the second pinned layer.

In particular, in the case of the CPP type sensor film, when it has a pinned layer adjacent to an existent exchange bias layer of PtMn, since the PtMn layer has a specific resistivity about 10 times as high as other layers, the thickness of the PtMn layer is substantially equal with other layers and current flows through the PtMn layer and other layers in series, the amount of heat generated by current in the PtMn layer is about 10 times the amount of heat generation of other layers. The greater heat generated in the PtMn layer causes a problem in that the sense current cannot be increased. By using the pinned layer of this embodiment, it is not necessary to use a layer made of PtMn with its high specific resistivity and therefore, the amount of heat generation can be decreased by about 1/10. Since the allowable sense current can be increased by about 10 times over using PtMn, and the obtainable signal output can be increased.

CONCLUSION

In conclusion, it can be seen that embodiments of the present invention can provide a magnetoresistive head capable of controlling the magnetization direction of the pinned layer to a desired direction by the application of a magnetic field at room temperature and coping with high recording density which is stable to the magnetic field from the recording medium or magnetic field from the recording head. For example, in the existent type head, since the magnetization direction of the pinned layer near the air bearing surface is deviated from the desired direction during air bearing surface fabrication, the performance is deteriorated remarkably for a 0.1 μm class head of the MR height corresponding to the high recording density, whereas embodiments of the present invention can provide a head of sufficient performance for the class since the magnetization direction of the pinned layer can be controlled after fabrication and, accordingly, the magnetization direction of the pinned layer can be controlled to a desired direction.

While the above is a complete description of specific embodiments of the invention, the above description should not be taken as limiting the scope of the invention as defined by the claims.

What is claimed is:

1. A magnetoresistive head comprising: a pinned layer; a free layer; and a non-magnetic spacer film formed between the pinned layer and the free layer; wherein the pinned layer has a first ferromagnetic film and a second ferromagnetic film anti-ferromagnetically coupled to each other by way of an anti-ferromagnetic coupling film; and a coercivity of the first ferromagnetic film is 200 Oe or more and a coercivity of the second ferromagnetic film is 20 Oe or less.

2. A magnetoresistive head comprising: a pinned layer; a free layer; and a non-magnetic spacer film formed between the pinned layer and the free layer; wherein the pinned layer has a first ferromagnetic film and a second ferromagnetic film anti-ferromagnetically coupled to each other by way of an anti-ferromagnetic coupling film; a composition of the first ferromagnetic film is within a range of: $Co_{100-X}Fe_X$ (at %) $40.ltoreq.X.ltoreq.80$; and a composition of the second ferromagnetic film is within a range of: $Co_{100-Y}Fe_Y$ (at %) $0.ltoreq.Y.ltoreq.20$, wherein the anti-ferromagnetic coupling film is formed of Ru and has a thickness within a range from 3.0 to 4.0 .ANG.

3. A magnetoresistive head according to claim 1, wherein the anti-ferromagnetic coupling film is formed of Ru and has a thickness within a range from 3.0 to 4.0 .ANG.

4. A magnetoresistive head according to claim 1 or 2, wherein a relation between an imaginal thickness DA0 of the first ferromagnetic film that has a magnetic moment equal to a magnetic moment of the second ferromagnetic film and a thickness DA of the first ferromagnetic film satisfies: $0.0227.ltoreq.(DA-DA0)/DA0.ltoreq.0.136$.

5. A magnetoresistive head according to claim 4, wherein the magnetic moment of the first ferromagnetic film is larger than that of the second ferromagnetic film.

6. A magnetoresistive head according to claim 1 or 2, wherein a layer in contact with the first ferromagnetic film is formed from one of Ru, Ta, Cu, and NiFeCr.

7. A magnetoresistive head according to claim 1 or 2, wherein: the free layer is on the side of a substrate and the pinned layer is on a side remote from the substrate relative to the free layer; and wherein the magnetoresistive head has an underlayer adjacent to the free layer, the underlayer having an NiFeCr layer on the side of the substrate.

8. A magnetoresistive head according to claim 3, wherein: the free layer is on the side of a substrate and the pinned layer is on a side remote from the substrate relative to the free layer; and wherein the magnetoresistive head has an underlayer adjacent to the free layer, the underlayer having an NiFeCr layer on the side of the substrate.

9. A magnetoresistive head according to claim 4, wherein: the free layer is on the side of a substrate and the pinned layer is on a side remote from the substrate relative to the free layer; and wherein the magnetoresistive head has an underlayer adjacent to the free layer, the underlayer having an NiFeCr layer on the side of the substrate.

10. A magnetoresistive head according to claim 5, wherein: the free layer is on the side of a substrate and the pinned layer is on a side remote from the substrate relative to the free layer; and wherein the magnetoresistive head has an underlayer adjacent to the free layer, the underlayer having an NiFeCr layer on the side of the substrate.

11. A magnetoresistive head according to claim 6, wherein: the free layer is on the side of a substrate and the pinned layer is on a side remote from the substrate relative to the free layer; and wherein the magnetoresistive head has an underlayer adjacent to the free layer, the underlayer having an NiFeCr layer on the side of the substrate.

12. A magnetoresistive head according to claim 1 or 2, wherein: the pinned layer is on the side of the substrate and the free layer is on a side remote from the substrate relative to the pinned layer; and wherein an underlayer adjacent to the first ferromagnetic film on the side of the substrate comprises a stack of NiFeCr and Ru, a stack of NiFeCr, Ru, and NiFe, or a stack of NiFeCr, Ru, NiFe and Cu, in order from the side of the substrate.

13. A magnetoresistive head according to claim 3, wherein: the pinned layer is on the side of the substrate and the free layer is on a side remote from the substrate relative to the pinned layer; and wherein an underlayer adjacent to the first ferromagnetic film on the side of the substrate comprises a stack of NiFeCr and Ru, a stack of NiFeCr, Ru, and NiFe, or a stack of NiFeCr, Ru, NiFe and Cu, in order from the side of the substrate.

14. A magnetoresistive head according to claim 4, wherein: the pinned layer is on the side of the substrate and the free layer is on a side remote from the substrate relative to the pinned layer; and wherein an underlayer adjacent to the first ferromagnetic film on the side of the substrate comprises a stack of NiFeCr and Ru, a stack of NiFeCr, Ru, and NiFe, or a stack of NiFeCr, Ru, NiFe and Cu, in order from the side of the substrate.

15. A magnetoresistive head according to claim 5, wherein: the pinned layer is on the side of the substrate and the free layer is on a side remote from the substrate relative to the pinned layer; and wherein an underlayer adjacent to the first ferromagnetic film on the side of the substrate comprises a stack of NiFeCr and Ru, a stack of NiFeCr, Ru, and NiFe, or a stack of NiFeCr, Ru, NiFe and Cu, in order from the side of the substrate.

16. A magnetoresistive head according to claim 6, wherein: the pinned layer is on the side of the substrate and the free layer is on a side remote from the substrate relative to the pinned layer; and wherein an underlayer adjacent to the first ferromagnetic film on the side of the substrate comprises a stack of NiFeCr and Ru, a stack of NiFeCr, Ru, and NiFe, or a stack of NiFeCr, Ru, NiFe and Cu, in order from the side of the substrate.

17. A magnetoresistive head according to claim 1 or 2, wherein: the pinned layer is on the side of a substrate and the free layer is on a side remote from the substrate relative to the pinned layer; and an underlayer adjacent to the first ferromagnetic film on the side of the substrate comprises a stack of NiFeCr, NiFe, PtMn and Ru, or a stack of NiFeCr, NiFe, PtMn and Cu, in order from the side of the substrate.

18. A magnetoresistive head according to claim 3, wherein: the pinned layer is on the side of a substrate and the free layer is on a side remote from the substrate relative to the pinned layer; and an underlayer adjacent to the first ferromagnetic film on the side of the substrate comprises a stack of NiFeCr, NiFe, PtMn and Ru, or a stack of NiFeCr, NiFe, PtMn and Cu, in order from the side of the substrate.

19. A magnetoresistive head according to claim 4, wherein: the pinned layer is on the side of a substrate and the free layer is on a side remote from the substrate relative to the pinned layer; and an underlayer adjacent to the first ferromagnetic film on the side of the substrate comprises a stack of NiFeCr, NiFe, PtMn and Ru, or a stack of NiFeCr, NiFe, PtMn and Cu, in order from the side of the substrate.

20. A magnetoresistive head according to claim 5, wherein: the pinned layer is on the side of a substrate and the free layer is on a side remote from the substrate relative to the pinned layer; and an underlayer adjacent to the first ferromagnetic film on the side of the substrate comprises a stack of NiFeCr, NiFe, PtMn and Ru, or a stack of NiFeCr, NiFe, PtMn and Cu, in order from the side of the substrate.

21. A magnetoresistive head according to claim 6, wherein: the pinned layer is on the side of a substrate and the free layer is on a side remote from the substrate relative to the pinned layer; and an underlayer adjacent to the first ferromagnetic film on the side of the substrate comprises a stack of NiFeCr, NiFe, PtMn and Ru, or a stack of NiFeCr, NiFe, PtMn and Cu, in order from the side of the substrate.

22. A magnetoresistive head comprising: a first pinned layer; a second pinned layer; a free layer; a non-magnetic spacer film formed between the first pinned layer and the free layer; and another non-magnetic spacer film formed between the second pinned layer and the free layer; wherein each of the first and the second pinned layer has a first ferromagnetic film and a second ferromagnetic film anti-ferromagnetically coupled with each other by way of an anti-ferromagnetic coupling film; and a coercivity of the first ferromagnetic film is 200 Oe or more and a coercivity of the second magnetic layer is 20 Oe or less.

23. A magnetoresistive head comprising: a first pinned layer; a second pinned layer; a free layer; a non-magnetic spacer film formed between the first pinned layer and the free layer; and another non-magnetic spacer film formed between the second pinned layer and the free layer; wherein each of the first and the second pinned layer has a first ferromagnetic film and a second ferromagnetic film anti-ferromagnetically coupled with each other by way of an anti-ferromagnetic coupling film; and wherein a composition of each of the first ferromagnetic films disposed in each of the first pinned layer and the second pinned layer is within a range of: $Co_{100-X}Fe_X$ (at %) $40 \leq X \leq 80$, and a composition of the second ferromagnetic film is within a range of: $Co_{100-Y}Fe_Y$ (at %) $0 \leq Y \leq 20$ wherein each of the anti-ferromagnetic coupling film of the first pinned layer and the second pinned layer is formed of Ru and has a thickness within a range from 3.0 to 4.0 .ANG.

24. A magnetoresistive head according to claim 22, wherein each of the anti-ferromagnetic coupling films of the first pinned layer and the second pinned layer is made of Ru and has a thickness within a range from 3.0 to 4.0 .ANG.

25. A magnetoresistive head according to claim 22 or 23, wherein a relation between the imaginal thickness DA0 of the first ferromagnetic film that has a magnetic moment equal to the magnetic moment of the second ferromagnetic film and a thickness DA of the first ferromagnetic film satisfies: $0.0227 \leq (DA-DA0)/DA0 \leq 0.136$.

26. A magnetoresistive head according to claim 25, wherein the magnetic moment of the first ferromagnetic film is larger than that of the second ferromagnetic film.

27. A method of manufacturing a magnetoresistive head comprising a pinned layer having a first ferromagnetic film and a second ferromagnetic film anti-ferromagnetically coupled with each other by way of an anti-ferromagnetic coupling film, a free layer and a permanent magnet film disposed at an end of the free layer, said method comprising: a first magnetic field application step of applying a magnetic field in a desired direction different from a direction of a magnetic moment magnetized to the pinned layer; and a second magnetic field application step of applying a magnetic field in a direction different from the direction of the magnetic field application in the first magnetic field application step, wherein said first and second magnetic field application step is conducted at room temperature.

28. A method of manufacturing a magnetoresistive head comprising a pinned layer having a first ferromagnetic film and a second ferromagnetic film anti-ferromagnetically coupled with each other by way of an anti-ferromagnetic coupling film, a free layer and a permanent magnet film disposed at an end of the free layers said method comprising:
a first magnetic field application step of applying a magnetic field in a desired direction different from a direction of a magnetic moment magnetized to the pinned layer; and
a second magnetic field application step of applying a magnetic field in a direction different from the direction of the magnetic field application in the first magnetic field application step, wherein the following relation is satisfied: $H1 \geq 0.4\ Hs\ Hc \leq H2 \leq 0.35\ Hs$, where Hs is a saturation magnetic filed that brings respective magnetic moments of the first ferromagnetic film and the second ferromagnetic film antiparallel to each other into a parallel state, Hc is the coercivity of the permanent magnetic layer, H1 is a magnitude of an application magnetic field in the first magnetic field application step, and H2 is a magnitude of an application magnetic field in the step of applying the second magnetic field.

* * * * *